(12) United States Patent
Chen et al.

(10) Patent No.: US 11,785,237 B2
(45) Date of Patent: Oct. 10, 2023

(54) METHODS FOR SIGNALING VIDEO CODING DATA

(71) Applicant: ALIBABA GROUP HOLDING LIMITED, Grand Cayman (KY)

(72) Inventors: Jie Chen, Beijing (CN); Jiancong Luo, Skillman, NJ (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/214,335

(22) Filed: Mar. 26, 2021

(65) Prior Publication Data

US 2021/0306648 A1 Sep. 30, 2021

Related U.S. Application Data

(60) Provisional application No. 63/000,443, filed on Mar. 26, 2020.

(51) Int. Cl.
*H04N 7/12* (2006.01)
*H04N 19/44* (2014.01)
(Continued)

(52) U.S. Cl.
CPC .......... *H04N 19/44* (2014.11); *H04N 19/119* (2014.11); *H04N 19/132* (2014.11);
(Continued)

(58) Field of Classification Search
CPC .... H04N 19/44; H04N 19/119; H04N 19/132; H04N 19/176; H04N 19/46;
(Continued)

(56) References Cited

U.S. PATENT DOCUMENTS

| | | |
|---|---|---|
| 2011/0194613 A1 | 8/2011 | Chen et al. |
| 2013/0208788 A1 | 8/2013 | Chen et al. |

(Continued)

FOREIGN PATENT DOCUMENTS

| | | |
|---|---|---|
| CN | 112997501 | 6/2021 |
| KR | 20210080358 | 6/2021 |

OTHER PUBLICATIONS

PCT International Search Report and Written Opinion dated Jun. 9, 2021, issued in corresponding International Application No. PCT/US2021/024447 (8 pgs).

(Continued)

*Primary Examiner* — Gims S Philippe
(74) *Attorney, Agent, or Firm* — Finnegan, Henderson, Farabow, Garrett & Dunner, LLP

(57) ABSTRACT

The present disclosure provides systems and methods for wrap-around motion compensation. One exemplary method comprises: receiving a wrap-around motion compensation flag; determining whether a wrap-around motion compensation is enabled based on the wrap-around motion compensation flag; in response to a determination that the wrap-around motion compensation is enabled, receiving data indicating a difference between a width of the picture and an offset used for determining a horizontal wrap-around position; and performing a motion compensation according to the wrap-around motion compensation flag and the difference.

18 Claims, 34 Drawing Sheets

Reference picture

Current picture

(51) Int. Cl.
*H04N 19/513* (2014.01)
*H04N 19/176* (2014.01)
*H04N 19/46* (2014.01)
*H04N 19/132* (2014.01)
*H04N 19/119* (2014.01)

(52) U.S. Cl.
CPC .......... *H04N 19/176* (2014.11); *H04N 19/46* (2014.11); *H04N 19/513* (2014.11)

(58) Field of Classification Search
CPC .. H04N 19/513; H04N 19/174; H04N 19/563; H04N 19/70; H04N 19/597
USPC .................................................. 375/240.25
See application file for complete search history.

(56) References Cited

U.S. PATENT DOCUMENTS

| | | | |
|---|---|---|---|
| 2015/0256841 A1 | 9/2015 | Yie et al. | |
| 2017/0085917 A1 | 3/2017 | Hannuksela | |
| 2017/0188032 A1 | 6/2017 | Rossato et al. | |
| 2019/0253622 A1 | 8/2019 | Van der Auwera et al. | |
| 2019/0281322 A1 | 9/2019 | Laroche et al. | |
| 2020/0154139 A1 | 5/2020 | Hannuksela | |
| 2020/0213617 A1 | 7/2020 | Choi et al. | |
| 2021/0029371 A1* | 1/2021 | Seregin | H04N 19/597 |
| 2021/0029374 A1* | 1/2021 | Zhang | G06F 1/03 |
| 2021/0160482 A1* | 5/2021 | Chiu | H04N 19/59 |
| 2021/0203974 A1* | 7/2021 | Choi | H04N 19/132 |
| 2021/0203988 A1* | 7/2021 | Chang | H04N 19/80 |
| 2021/0211706 A1* | 7/2021 | Choi | H04N 19/51 |
| 2022/0007053 A1* | 1/2022 | Hanhart | H04N 19/184 |
| 2022/0038737 A1* | 2/2022 | He | H04N 19/174 |

OTHER PUBLICATIONS

"Requirements for a Future Video Coding Standard v5," International Organisation for Standardisation, Torino, IT, 14 pages (2017).
Bross et al., "Versatile Video Coding (Draft 8), "JVET-Q2001-vD, 17th Meeting: Brussels, BE, Jan. 7-17, 2020, 509 pages.
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
Chen et al., "Algorithm Description of Joint Exploration Test Model 8 (JEM 8)," JVET-Q2002-v1, 17$^{th}$ Meeting: Brussels, BE, Jan. 7-17, 2020, 91 pages.
Hanhart et al., "AHG8: Horizontal geometry padding for PERP," JVET-K0333, 11$^{th}$ Meeting: Ljubljana, SI, Jul. 10-18, 2018, 4 pages.
Hanhart et al., "CE13: PERP with horizontal geometry padding of reference pictures (Test 3.3)," JVET-L0231, 2018, 11 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Jem, https://jvet.hhi.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
Zhou et al. "AHG8: Unrestricted Motion Compensation for 360 Video in ERP Format," JVET-E0065, 5$^{th}$ Meeting: Geneva, CH, Jan. 12-20, 2017, 3 pages.
International Organisation for Standardisation "Requirements for a Future Video Coding Standard v5," N17074, Torino, IT. pp. 1-13 (2017).
Jill M. Boyce et al. "EE4: Padded ERP (PERP) project format," Joint Video Exploration Team (JVET), 7th Meeting: Torino It, JVET-G0098, pp. 1-11 (2018).
Minhua Zhou "AHG8: Unrestricted Motion Compensation for 360 Video in ERP Format," Joint Video Exploration Team (JVET) of ITU-T, 5$^{th}$ Meeting: Geneva, CH, pp. 1-3 (2017).
Nister et al., "Visual Odometry," Proceedings of the 2004 IEEE Computer Society Conference on Computer Vision and Pattern Recognition, 10 pages, 2004.
PCT International Search Report and Written Opinion dated Mar. 23, 2021, issued in corresponding International Application No. PCT/US2020/065515 (13 pgs ).
Philippe Hanhart et al. "JVET common test conditions and evaluation procedures for 360-degree video," Joint Video Exploration Team (JVET) of ITU-T, 12th Meeting: Macau, CN, pp. 1-7 (2018).
Yan Ye et al. "Algorithm descriptions of projection format conversion and video quality metrics in 350Lib Version 9" Joint Video Exploration Team (JVET) of ITU-T, 13$^{th}$ Meeting: Marrakech, MA. pages 1-47 (2019).
Bross et al., "Versatile Video Coding (Draft 7)," JVET-P2001-V9, 16$^{th}$ Meeting: Geneva, CH, Oct. 1-11, 2019, 491 pages.
Bross et al., "Versatile Video Coding (Draft 7)," JVET-P2001-VE, 16$^{th}$ Meeting: Geneva, CH, Oct. 1-11, 2019, 489 pages.
Chen et al., "AHG8/AHG9: On horizontal wrap-around motion compensation," JVET-Q0416-v1, 17$^{th}$ Meeting: Brussels, BE, Jan. 7-17, 2020, 8 pages.
Chen et al., "Algorithm description for Versatile Video Coding and Test Model 7 (VTM 7)," JVET-P2002-v1, 16$^{th}$ Meeting: Geneva, CH, Oct. 1-11, 2019, 90 pages.
Choi et al., "AHG9: Text for combination of wrap around offset and RPR," JVET-Q0764, 17$^{th}$ Meeting: Brussels, BE, Jan. 7-17, 2020, 2 pages.
European Patent Office Communication issued for Application No. 20901172.5 which encloses the extended European Search Report which includes pursuant to Rule 62 EPC, the Supplementary European Search Report (Art. 153(7) EPC) and the European search opinion, dated Jan. 3, 2023, 12 pages.
Sullivan et al., Meeting Report of the 17$^{th}$ Meeting of the Joint Video Experts Team (JVET), Brussels, BE, Jan. 7-17, 2020,: JVET-Q2000-v1, 17$^{th}$ Meeting: Brussels, BE, Jan. 7-17, 2020, 378 pages.

* cited by examiner

| | Descriptor |
|---|---|
| pic_parameter_set_rbsp( ) { | |
| ... | |
| pps_ref_wraparound_enabled_flag | u(1) |
| if( pps_ref_wraparound_enabled_flag ) | |
| pps_ref_wraparound_offset | ue(v) |
| ... | u(1) |

FIG. 7

| pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY / MinCbSizeY + 1 is greater than pic_width_in_luma_samples / MinCbSizeY − 1, the value of pps_ref_wraparound_enabled_flag shall be equal to 0. When sps_ref_wraparound_enabled_flag is equal to 0, the value of pps_ref_wraparound_enabled_flag shall be equal to 0. |
|---|
| pps_ref_wraparound_offset plus ( CtbSizeY / MinCbSizeY ) + 2 specifies the offset used for computing the horizontal wrap-around position in units of MinCbSizeY luma samples. The value of pps_ref_wraparound_offset shall be in the range of 0 to ( pic_width_in_luma_samples / MinCbSizeY ) − ( CtbSizeY / MinCbSizeY ) − 2, inclusive.<br><br>The variable PpsRefWraparoundOffset is set equal to pps_ref_wraparound_offset + ( CtbSizeY /MinCbSizeY ) + 2. |

FIG. 8

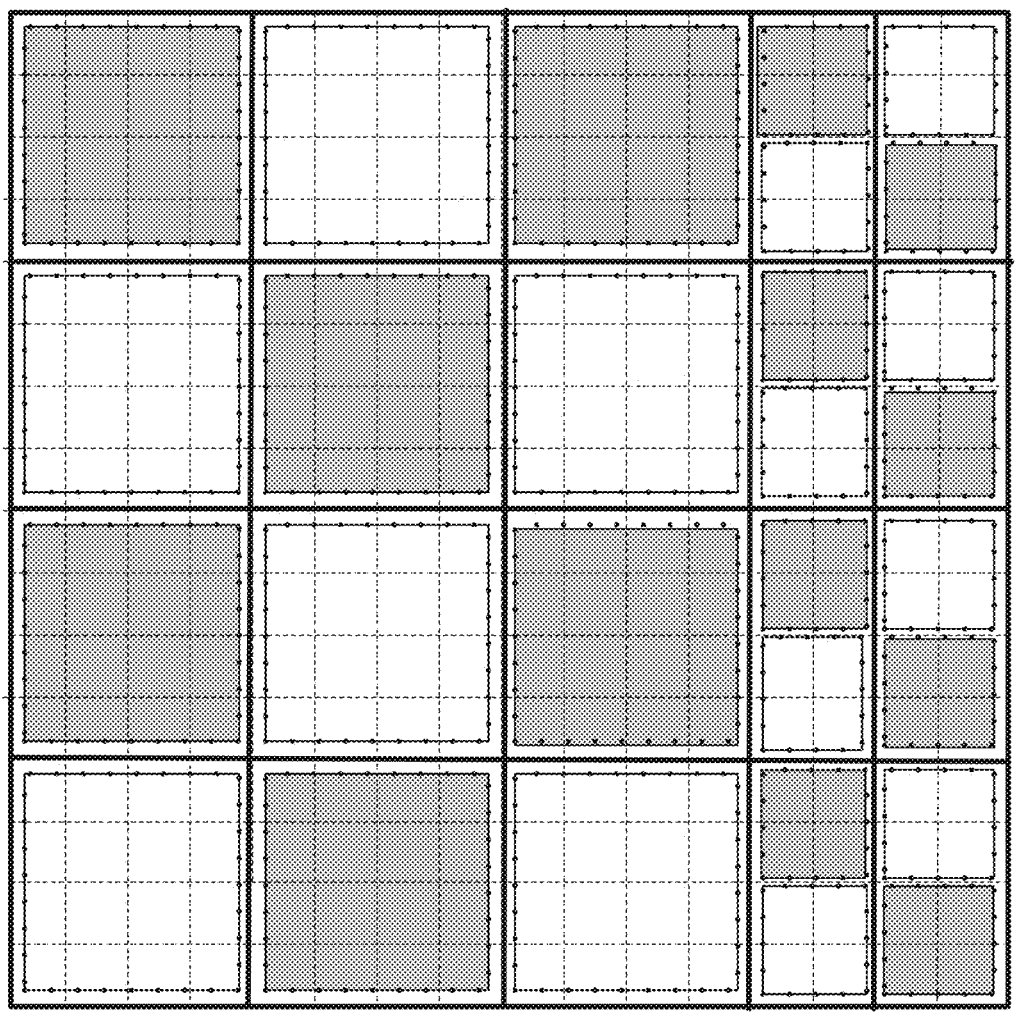
 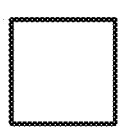 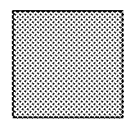 
CTU             Tile            Slice            subpicture
FIG. 9

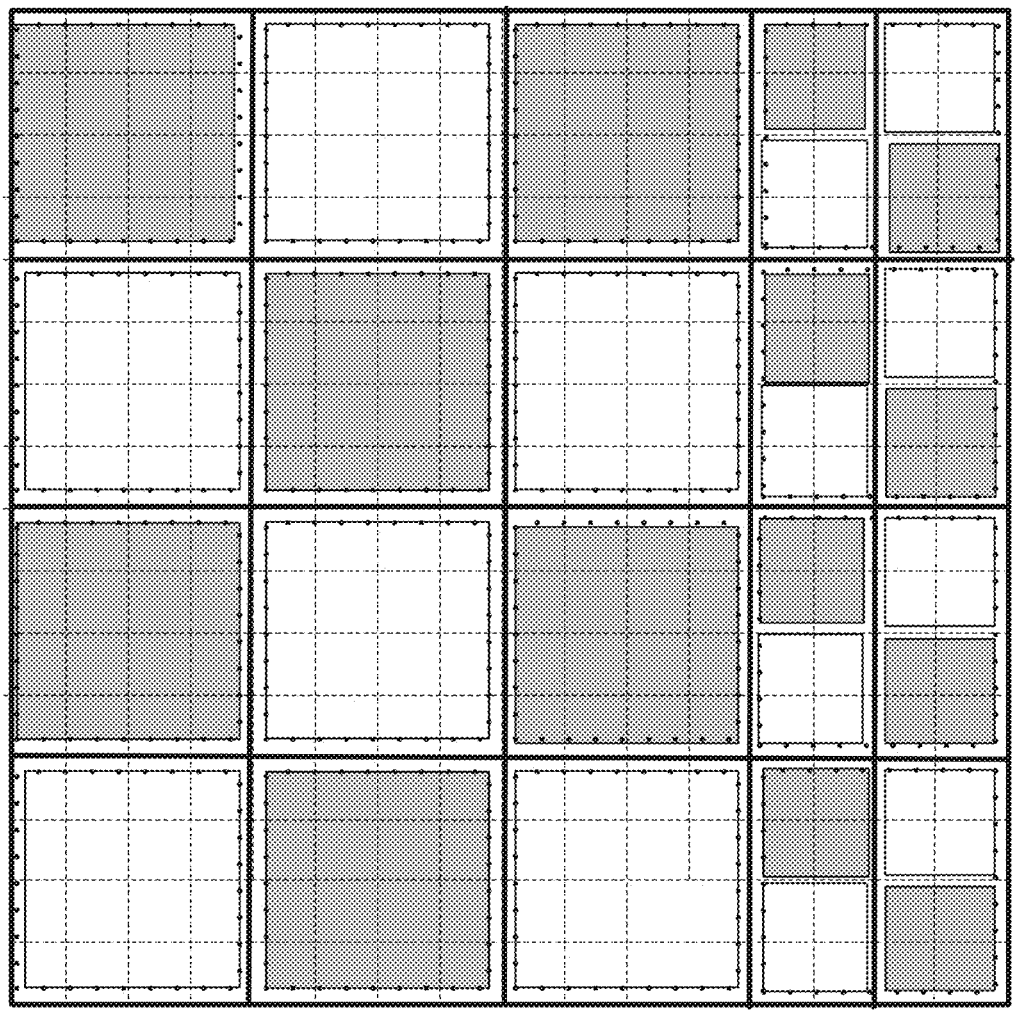
 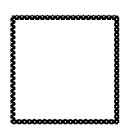 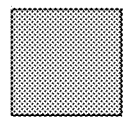 
CTU　　　Tile　　　Slice　　　subpicture
FIG. 10

| | Descriptor |
|---|---|
| pic_parameter_set_rbsp( ) { | |
| ... | |
|   if( NumTilesInPic > 1 ) | |
|     rect_slice_flag | u(1) |
|   if( rect_slice_flag ) | |
|     single_slice_per_subpic_flag | u(1) |
|   if( rect_slice_flag && !single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1[ i ] | ue(v) |
|       if( NumTileRows > 1 && | |
|         ( tile_idx_delta_present_flag || tileIdx % NumTileColumns == 0 ) ) | |
|         slice_height_in_tiles_minus1[ i ] | ue(v) |
|       if( slice_width_in_tiles_minus1[ i ] == 0 && | |
|         slice_height_in_tiles_minus1[ i ] == 0 && | |
|         RowHeight[ SliceTopLeftTileIdx[ i ] / NumTileColumns ] > 1 ) { | |
|         num_exp_slices_in_tile[ i ] | ue(v) |
|         numExpSlicesInTile = num_exp_slices_in_tile[ i ] | |
|         for( j = 0; j < numExpSlicesInTile; j++ ) | |
|           exp_slice_height_in_ctus_minus1[ i ][ j ] | ue(v) |
|         i += NumSlicesInTile[ i ] | |
|       } | |
|       if( tile_idx_delta_present_flag && i < num_slices_in_pic_minus1 ) | |
|         tile_idx_delta[ i ] | se(v) |
|     } | |
|   } | |
| ... | |

FIG. 11

| |
|---|
| rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1. |
| single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. |
| num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus1 is inferred to be equal to 0. |
| tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0. |
| slice_width_in_tiles_minus1[i] plus 1 specifies the width of the i-th rectangular slice in units of tile columns. The value of slice_width_in_tiles_minus1[i] shall be in the range of 0 to NumTileColumns − 1, inclusive. When slice_width_in_tiles_minus1[i] is not present, the following applies:<br>– If NumTileColumns is equal to 1, the value of slice_width_in_tiles_minus1[i] is inferred to be equal to 0.<br>– Otherwise, the value of slice_width_in_tiles_minus1[i] is inferred as specified in clause 6.5.1. |
| slice_height_in_tiles_minus1[i] plus 1 specifies the height of the i-th rectangular slice in units of tile rows. The value of slice_height_in_tiles_minus1[i] shall be in the range of 0 to NumTileRows − 1, inclusive. When slice_height_in_tiles_minus1[i] is not present, the following applies:<br>– If NumTileRows is equal to 1, or tile_idx_delta_present_flag is equal to 0 and tileIdx % NumTileColumns is greater than 0), the value of slice_height_in_tiles_minus1[i] is inferred to be equal to 0.<br>– Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i − 1]. |

FIG. 12 num_exp_slices_in_tile[ i ] specifies the number of explicitly provided slice heights in the current tile that contains more than one rectangular slices. The value of num_exp_slices_in_tile[ i ] shall be in the range of 0 to RowHeight[ tileY ] − 1, inclusive, where tileY is the tile row index containing the i-th slice. When not present, the value of num_exp_slices_in_tile[ i ] is inferred to be equal to 0. When num_exp_slices_in_tile[ i ] is equal to 0, the value of the variable NumSlicesInTile[ i ] is derived to be equal to 1.

exp_slice_height_in_ctus_minus1[ j ] plus 1 specifies the height of the j-th rectangular slice in the current tile in units of CTU rows. The value of exp_slice_height_in_ctus_minus1[ j ] shall be in the range of 0 to RowHeight[ tileY ] − 1, inclusive, where tileY is the tile row index of the current tile.
When num_exp_slices_in_tile[ i ] is greater than 0, the variable NumSlicesInTile[ i ] and SliceHeightInCtusMinus1[ i + k ] for k in the range of 0 to NumSlicesInTile[ i ] − 1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] = exp_slice_height_in_ctu_minus1[ j ]
    remainingHeightInCtbsY −= SliceHeightInCtusMinus1[ j ]
}
uniformSliceHeightMinus1 = SliceHeightInCtusMinus1[ i − 1 ]                              (81)
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ j ] = j
``` tile_idx_delta[ i ] specifies the difference between the tile index of the first tile in the i-th rectangular slice and the tile index of the first tile in the ( i + 1 )-th rectangular slice. The value of tile_idx_delta[ i ] shall be in the range of −NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.

FIG. 12 (Continued)

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 )) | |
|     slice_address | u(v) |
|   ... | |

FIG. 13 picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_address specifies the slice address of the slice. When not present, the value of slice_address is inferred to be equal to 0. When rect_slice_flag is equal to 1 and NumSlicesInSubpic[ CurrSubpicIdx ] is equal to 1, the value of slice_address is inferred to be equal to 0.

If rect_slice_flag is equal to 0, the following applies:
- The slice address is the raster scan tile index.
- The length of slice_address is Ceil( Log2 ( NumTilesInPic ) ) bits.
- The value of slice_address shall be in the range of 0 to NumTilesInPic − 1, inclusive.

Otherwise (rect_slice_flag is equal to 1), the following applies:
- The slice address is the subpicture-level slice index of the slice.
- The length of slice_address is Ceil( Log2( NumSlicesInSubpic[ CurrSubpicIdx ] ) ) bits.
- The value of slice_address shall be in the range of 0 to NumSlicesInSubpic[ CurrSubpicIdx ] − 1, inclusive.

It is a requirement of bitstream conformance that the following constraints apply:
- If rect_slice_flag is equal to 0 or subpic_info_present_flag is equal to 0, the value of slice_address shall not be equal to the value of slice_address of any other coded slice NAL unit of the same coded picture.
- Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

FIG. 14

| | Descriptor |
|---|---|
| pic_parameter_set_rbsp( ) { | |
| ... | |
| pps_ref_wraparound_enabled_flag | u(1) |
| if( pps_ref_wraparound_enabled_flag ) | |
| ~~pps_ref_wraparound_offset~~ pps_pic_width_minus_wraparound_offset | ue(v) |
| ... | u(1) |

FIG. 15

| pps_ref_wraparound_enabled_flag equal to 1 specifies that horizontal wrap-around motion compensation is enabled for pictures referring to the PPS. pps_ref_wraparound_enabled_flag equal to 0 specifies that horizontal wrap-around motion compensation is disabled. When sps_ref_wraparound_enabled_flag is equal to 0 or the value of CtbSizeY / MinCbSizeY + 1 is greater than pic_width_in_luma_samples / MinCbSizeY − 1, the value of pps_ref_wraparound_enabled_flag shall be equal to 0. |
|---|
| pps_pic_width_minus_wraparound_offset specifies the difference between the picture width and the offset used for computing the horizontal wrap-around position in units of MinCbSizeY luma samples. The value of pps_pic_width_minus_wraparound_offset shall be less than or equal to ( pps_pic_width_in_luma_samples / MinCbSizeY ) − ( CtbSizeY / MinCbSizeY ) − 2.<br><br>The variable PpsRefWraparoundOffset is set equal to ~~pps_ref_wraparound_offset + ( CtbSizeY / MinCbSizeY )~~ + 2 (pps_pic_width_in_luma_samples/MinCbSizeY- pps_pic_width_minus_wraparound_offset). |

FIG. 16

| | Descriptor |
|---|---|
| pic_parameter_set_rbsp() { | |
| ... | |
| pps_ref_wraparound_enabled_flag | u(1) |
| *wraparound_offset_type* | u(1) |
| if( pps_ref_wraparound_enabled_flag ) | |
| pps_ref_wraparound_offset | ue(v) |
| ... | u(1) |

FIG. 17

| pps_ref_wraparound_enabled_flag equal to 1 specifies that horizontal wrap-around motion compensation is enabled for pictures referring to the PPS. pps_ref_wraparound_enabled_flag equal to 0 specifies that horizontal wrap-around motion compensation is disabled. When sps_ref_wraparound_enabled_flag is equal to 0 or the value of CtbSizeY / MinCbSizeY + 1 is greater than pic_width_in_luma_samples / MinCbSizeY − 1, the value of pps_ref_wraparound_enabled_flag shall be equal to 0. |
| --- |
| pps_ref_wraparound_offset specifies the value that is used to determine the value of PpsRefWraparoundOffset. The value of pps_ref_wraparound_offset shall be in the range of 0 to floor( ( pic_width_in_luma_samples / MinCbSizeY − ( CtbSizeY / MinCbSizeY ) − 2 ) / 2 ). <br><br> wraparound_offset_type specifies the type of pps_ref_wraparound_offset. <br> The variable PpsRefWraparoundOffset is derived as follows: <br> if ( wraparound_offset_type == 0 ) <br>    PpsRefWraparoundOffset = pps_ref_wraparound_offset + ( CtbSizeY / MinCbSizeY ) + 2 <br> else <br>    PpsRefWraparoundOffset = Pps_pic_width_in_luma_samples/MinCbSizeY − pps_ref_wraparound_offset |

FIG. 18

| | Descriptor |
|---|---|
| pic_parameter_set_rbsp( ) { | |
| ... | |
| if( NumTilesInPic > 1 ) | |
|   rect_slice_flag | u(1) |
| if( rect_slice_flag ) | |
|   single_slice_per_subpic_flag | u(1) |
| if( rect_slice_flag && !single_slice_per_subpic_flag ) { | |
|   ~~num_slices_in_pic_minus1~~ num_slices_in_pic_minus2 | ue(v) |
|   ~~if( num_slices_in_pic_minus1 > 0 )~~ | |
|   tile_idx_delta_present_flag | u(1) |
|   for( i = 0; ~~i < num_slices_in_pic_minus1~~ i <= num_slices_in_pic_minus2; i++ ) { | |
|     if( NumTileColumns > 1 ) | |
|       slice_width_in_tiles_minus1[ i ] | ue(v) |
|     if( NumTileRows > 1 && | |
|       ( tile_idx_delta_present_flag || tileIdx % NumTileColumns == 0 ) ) | |
|       slice_height_in_tiles_minus1[ i ] | ue(v) |
|     if( slice_width_in_tiles_minus1[ i ] == 0 && | |
|       slice_height_in_tiles_minus1[ i ] == 0 && | |
|       RowHeight[ SliceTopLeftTileIdx[ i ] / NumTileColumns ] > 1 ) { | |
|       num_exp_slices_in_tile[ i ] | ue(v) |
|       numExpSlicesInTile = num_exp_slices_in_tile[ i ] | |
|       for( j = 0; j < numExpSlicesInTile; j++ ) | |
|         exp_slice_height_in_ctus_minus1[ j ] | ue(v) |
|       i += NumSlicesInTile[ i ] | |
|     } | |
|     if( tile_idx_delta_present_flag && ~~i < num_slices_in_pic_minus1~~ i <= num_slices_in_pic_minus2 ) | |
|       tile_idx_delta[ i ] | se(v) |
|   } | |
| } | |
| ... | |

FIG. 19

| |
|---|
| rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1. |
| single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. |
| ~~num_slices_in_pic_minus1_plus1~~ num_slices_in_pic_minus2 plus 2 specifies the number of rectangular slices in each picture referring to the PPS. The value of ~~num_slices_in_pic_minus1~~ num_slices_in_pic_minus2 shall be in the range of 0 to ~~MaxSlicesPerPicture − 1~~ MaxSlicesPerPicture − 2, inclusive, where MaxSlicesPerPicture is specified in Annex A. When no_pic_partition_flag is equal to 1, the value of ~~num_slices_in_pic_minus1~~ num_slices_in_pic_minus2 is inferred to be equal to ~~0~~ −1. |
| tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to −1. |
| slice_width_in_tiles_minus1[ i ] plus 1 specifies the width of the i-th rectangular slice in units of tile columns. The value of slice_width_in_tiles_minus1[ i ] shall be in the range of 0 to NumTileColumns − 1, inclusive. When slice_width_in_tiles_minus1[ i ] is not present, the following applies:<br>— If NumTileColumns is equal to 1, the value of slice_width_in_tiles_minus1[ i ] is inferred to be equal to 0.<br>— Otherwise, the value of slice_width_in_tiles_minus1[ i ] is inferred as specified in clause 6.5.1. |
| slice_height_in_tiles_minus1[ i ] plus 1 specifies the height of the i-th rectangular slice in units of tile rows. The value of slice_height_in_tiles_minus1[ i ] shall be in the range of 0 to NumTileRows − 1, inclusive. When slice_height_in_tiles_minus1[ i ] is not present, the following applies:<br>— If NumTileRows is equal to 1, or tile_idx_delta_present_flag is equal to 0 and tileIdx % NumTileColumns is greater than 0), the value of slice_height_in_tiles_minus1[ i ] is inferred to be equal to 0.<br>— Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[ i ] is inferred to be equal to slice_height_in_tiles_minus1[ i − 1 ]. |

FIG. 20 num_exp_slices_in_tile[ i ] specifies the number of explicitly provided slice heights in the current tile that contains more than one rectangular slices. The value of num_exp_slices_in_tile[ i ] shall be in the range of 0 to RowHeight[ tileY ] − 1, inclusive, where tileY is the tile row index containing the i-th slice. When not present, the value of num_exp_slices_in_tile[ i ] is inferred to be equal to 0. When num_exp_slices_in_tile[ i ] is equal to 0, the value of the variable NumSlicesInTile[ i ] is derived to be equal to 1.

exp_slice_height_in_ctus_minus1[ j ] plus 1 specifies the height of the j-th rectangular slice in the current tile in units of CTU rows. The value of exp_slice_height_in_ctus_minus1[ j ] shall be in the range of 0 to RowHeight[ tileY ] − 1, inclusive, where tileY is the tile row index of the current tile.
When num_exp_slices_in_tile[ i ] is greater than 0, the variable NumSlicesInTile[ i ] and SliceHeightInCtusMinus1[ i + k ] for k in the range of 0 to NumSlicesInTile[ i ] − 1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] = exp_slice_height_in_ctu_minus1[ j ]           (81)
    remainingHeightInCtbsY −= SliceHeightInCtusMinus1[ j ]
}
uniformSliceHeightMinus1 = SliceHeightInCtusMinus1[ i − 1 ]
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ j ] = j
``` tile_idx_delta[ i ] specifies the difference between the tile index of the first tile in the i-th rectangular slice and the tile index of the first tile in the ( i + 1 )-th rectangular slice. The value of tile_idx_delta[ i ] shall be in the range of −NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.

FIG. 20 (Continued)

| | Descriptor |
|---|---|
| pic_parameter_set_rbsp( ) { | |
| ... | |
| if( NumTilesInPic > 1 ) | |
| rect_slice_flag | u(1) |
| if( rect_slice_flag ) | |
| single_slice_per_subpic_flag | u(1) |
| if( rect_slice_flag && !single_slice_per_subpic_flag ) { | |
| ~~num_slices_in_pic_minus1~~ num_slices_in_pic_minus_subpic_num_minus1 | ue(v) |
| ~~if( num_slices_in_pic_minus1 > 0 )~~ | |
| tile_idx_delta_present_flag | u(1) |
| for( i = 0; i < ~~num_slices_in_pic_minus1~~ SliceNumInPic-1; i++ ) { | |
| if( NumTileColumns > 1 ) | |
| slice_width_in_tiles_minus1[ i ] | ue(v) |
| if( NumTileRows > 1 && | |
| ( tile_idx_delta_present_flag \|\| tileIdx % NumTileColumns == 0 ) ) | |
| slice_height_in_tiles_minus1[ i ] | ue(v) |
| if( slice_width_in_tiles_minus1[ i ] == 0 && | |
| slice_height_in_tiles_minus1[ i ] == 0 && | |
| RowHeight[ SliceTopLeftTileIdx[ i ] / NumTileColumns ] > 1 ) { | |
| num_exp_slices_in_tile[ i ] | ue(v) |
| numExpSlicesInTile = num_exp_slices_in_tile[ i ] | |
| for( j = 0; j < numExpSlicesInTile; j++ ) | |
| exp_slice_height_in_ctus_minus1[ i ][ j ] | ue(v) |
| i += NumSlicesInTile[ i ] | |
| } | |
| if( tile_idx_delta_present_flag && i < ~~num_slices_in_pic_minus1~~ SliceNumInPic-1 ) | |
| tile_idx_delta[ i ] | se(v) |
| } | |
| ... | |

FIG. 21

| |
|---|
| rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1. |
| single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. |
| ~~num_slices_in_pic_minus1~~ num_slices_in_pic_minus_subpic_num_minus1 ~~plus 1~~ plus subpicture number and plus 1 specifies the number of rectangular slices in each picture referring to the PPS. The value of ~~num_slices_in_pic_minus1~~ num_slices_in_pic_minus_subpic_num_minus_1 shall be in the range of 0 to MaxSlicesPerPicture − ~~1~~ sps_num_subpics_minus1 − 2, inclusive, where MaxSlicesPerPicture is specified in Annex A. When no_pic_partition_flag is equal to 1, the value of ~~num_slices_in_pic_minus1~~ num_slices_in_pic_minus_subpic_num_minus1 is inferred to be equal to 0 (sps_num_subpics_minus1 + 1). The variable SliceNumInPic is derived as SliceNumInPic = num_slices_in_pic_minus_subpic_num_minus1 + sp_num_subpics_minus1 + 2. |
| tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to ~~0~~ 1. |
| slice_width_in_tiles_minus1[ i ] plus 1 specifies the width of the i-th rectangular slice in units of tile columns. The value of slice_width_in_tiles_minus1[ i ] shall be in the range of 0 to NumTileColumns − 1, inclusive. When slice_width_in_tiles_minus1[ i ] is not present, the following applies: <br> – If NumTileColumns is equal to 1, the value of slice_width_in_tiles_minus1[ i ] is inferred to be equal to 0. <br> – Otherwise, the value of slice_width_in_tiles_minus1[ i ] is inferred as specified in clause 6.5.1. |
| slice_height_in_tiles_minus1[ i ] plus 1 specifies the height of the i-th rectangular slice in units of tile rows. The value of slice_height_in_tiles_minus1[ i ] shall be in the range of 0 to NumTileRows − 1, inclusive. When slice_height_in_tiles_minus1[ i ] is not present, the following applies: <br> – If NumTileRows is equal to 1, or tile_idx_delta_present_flag is equal to 0 and tileIdx % NumTileColumns is greater than 0), the value of slice_height_in_tiles_minus1[ i ] is inferred to be equal to 0. <br> – Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[ i ] is inferred to be equal to slice_height_in_tiles_minus1[ i − 1 ]. |

FIG. 22 num_exp_slices_in_tile[ i ] specifies the number of explicitly provided slice heights in the current tile that contains more than one rectangular slices. The value of num_exp_slices_in_tile[ i ] shall be in the range of 0 to RowHeight[ tileY ] − 1, inclusive, where tileY is the tile row index containing the i-th slice. When not present, the value of num_exp_slices_in_tile[ i ] is inferred to be equal to 0. When num_exp_slices_in_tile[ i ] is equal to 0, the value of the variable NumSlicesInTile[ i ] is derived to be equal to 1.

exp_slice_height_in_ctus_minus1[ j ] plus 1 specifies the height of the j-th rectangular slice in the current tile in units of CTU rows. The value of exp_slice_height_in_ctus_minus1[ j ] shall be in the range of 0 to RowHeight[ tileY ] − 1, inclusive, where tileY is the tile row index of the current tile.
When num_exp_slices_in_tile[ i ] is greater than 0, the variable NumSlicesInTile[ i ] and SliceHeightInCtusMinus1[ i + k ] for k in the range of 0 to NumSlicesInTile[ i ] − 1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++) {
    SliceHeightInCtusMinus1[ i++ ] = exp_slice_height_in_ctu_minus1[ j ]              (81)
    remainingHeightInCtbsY −= SliceHeightInCtusMinus1[ j ]
}
uniformSliceHeightMinus1 = SliceHeightInCtusMinus1[ i − 1 ]
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ j ] = j
``` tile_idx_delta[ i ] specifies the difference between the tile index of the first tile in the i-th rectangular slice and the tile index of the first tile in the (i + 1)-th rectangular slice. The value of tile_idx_delta[ i ] shall be in the range of −NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.

FIG. 22 (Continued)

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( ( rect_slice_flag && NumSlicesInSubpic[ CurrSubpicIdx ] > 1 ) \|\| <br>     ( !rect_slice_flag && NumTilesInPic > 1 ) ) && <br>     !picture_header_in_slice_header_flag ) | |
|     slice_address | u(v) |
|   ... | |

FIG. 23

METHODS FOR SIGNALING VIDEO CODING DATA

CROSS-REFERENCE TO RELATED APPLICATIONS

The present disclosure claims priority to and the benefits of priority to U.S. Provisional Patent Application No. 63/000,443, filed on Mar. 26, 2020. The provisional application is incorporated herein by reference in its entirety.

TECHNICAL FIELD

The present disclosure generally relates to video data processing, and more particularly, to methods and apparatuses for signaling information regarding wrap-around motion compensation, slice layout, and slice address.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for signaling video coding data, the method comprises: receiving a wrap-around motion compensation flag; determining whether a wrap-around motion compensation is enabled based on the wrap-around motion compensation flag; in response to a determination that the wrap-around motion compensation is enabled, receiving data indicating a difference between a width of the picture and an offset used for determining a horizontal wrap-around position; and performing a motion compensation according to the wrap-around motion compensation flag and the difference.

Embodiments of the present disclosure further provide a method for signaling video coding data, the method comprises: receiving a picture for coding, wherein the picture comprises one or more slices; and signaling, in a picture parameter set of the picture, a variable indicating a number of slices in the video frame minus 2.

Embodiments of the present disclosure further provide a method for signaling video coding data, the method comprises: receiving a picture for coding, wherein the picture comprises one or more slices and one or more subpictures; and signaling, in a picture parameter set of the picture, a variable indicating a number of slices in the picture minus a number of subpictures in the picture minus 1.

Embodiments of the present disclosure further provide a method for signaling video coding data, the method comprises: receiving a picture for coding, wherein the picture comprises one or more slices; signaling a variable indicating whether a picture header syntax structure for the picture is present within a slice header for the one or more slices; and signaling a slice address according to the variable.

Embodiments of the present disclosure further provide a system for performing video data processing, the system comprising: a memory storing a set of instructions; and a processor configured to execute the set of instructions to cause the system to perform: receiving a wrap-around motion compensation flag; determining whether a wrap-around motion compensation is enabled based on the wrap-around motion compensation flag; in response to a determination that the wrap-around motion compensation is enabled, receiving data indicating a difference between a width of the picture and an offset used for determining a horizontal wrap-around position; and performing a motion compensation according to the wrap-around motion compensation flag and the difference.

Embodiments of the present disclosure further provide a system for performing video data processing, the system comprising: a memory storing a set of instructions; and a processor configured to execute the set of instructions to cause the system to perform: receiving a picture for coding, wherein the picture comprises one or more slices; and signaling, in a picture parameter set of the picture, a variable indicating a number of slices in the video frame minus 2.

Embodiments of the present disclosure further provide a system for performing video data processing, the system comprising: a memory storing a set of instructions; and a processor configured to execute the set of instructions to cause the system to perform: receiving a picture for coding, wherein the picture comprises one or more slices and one or more subpictures; and signaling, in a picture parameter set of the picture, a variable indicating a number of slices in the picture minus a number of subpictures in the picture minus 1.

Embodiments of the present disclosure further provide a system for performing video data processing, the system comprising: a memory storing a set of instructions; and a processor configured to execute the set of instructions to cause the system to perform: receiving a picture for coding, wherein the picture comprises one or more slices; signaling a variable indicating whether a picture header syntax structure for the picture is present within a slice header for the one or more slices; and signaling a slice address according to the variable.

Embodiments of the present disclosure further provide non-transitory computer readable medium that stores a set of instructions that is executable by one or more processors of an apparatus to cause the apparatus to initiate a method for performing video data processing, the method comprising: receiving a wrap-around motion compensation flag; determining whether a wrap-around motion compensation is enabled based on the wrap-around motion compensation flag; in response to a determination that the wrap-around motion compensation is enabled, receiving data indicating a difference between a width of the picture and an offset used for determining a horizontal wrap-around position; and performing a motion compensation according to the wrap-around motion compensation flag and the difference.

Embodiments of the present disclosure further provide non-transitory computer readable medium that stores a set of instructions that is executable by one or more processors of an apparatus to cause the apparatus to initiate a method for performing video data processing, the method comprising: receiving a picture for coding, wherein the picture comprises one or more slices; and signaling, in a picture parameter set of the picture, a variable indicating a number of slices in the video frame minus 2.

Embodiments of the present disclosure further provide non-transitory computer readable medium that stores a set of instructions that is executable by one or more processors of an apparatus to cause the apparatus to initiate a method for performing video data processing, the method comprising: receiving a picture for coding, wherein the picture comprises one or more slices and one or more subpictures; and signaling, in a picture parameter set of the picture, a variable indicating a number of slices in the picture minus a number of subpictures in the picture minus 1.

Embodiments of the present disclosure further provide non-transitory computer readable medium that stores a set of instructions that is executable by one or more processors of an apparatus to cause the apparatus to initiate a method for performing video data processing, the method comprising: receiving a picture for coding, wherein the picture comprises one or more slices; signaling a variable indicating whether a picture header syntax structure for the picture is present within a slice header for the one or more slices; and signaling a slice address according to the variable.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 shows syntax of an example high level wrap-around offset, according to some embodiments of the present disclosure.

FIG. 8 shows semantics of an example high level wrap-around offset, according to some embodiments of the present disclosure.

FIG. 9 shows a schematic of an example slice and subpicture partitioning of a picture, according to some embodiments of the present disclosure.

FIG. 10 shows a schematic of an example slice and subpicture partitioning of a picture having different slices and subpictures, according to some embodiments of the present disclosure.

FIG. 11 shows syntax of an example picture parameter set for tile mapping and slice layouts, according to some embodiments of the present disclosure.

FIG. 12 shows semantics of an example picture parameter set for tile mapping and slice layouts, according to some embodiments of the present disclosure.

FIG. 13 shows syntax of an example slice header, according to some embodiments of the present disclosure.

FIG. 14 shows semantics of an example slice header, according to some embodiments of the present disclosure.

FIG. 15 shows syntax of an example improved picture parameter set, according to some embodiments of the present disclosure.

FIG. 16 shows semantics of an example improved picture parameter set, according to some embodiments of the present disclosure.

FIG. 17 shows syntax of an example picture parameter set with a variable wraparound_offset_type, according to some embodiments of the present disclosure.

FIG. 18 shows semantics of an example improved picture parameter set with a variable wraparound_offset_type, according to some embodiments of the present disclosure.

FIG. 19 shows syntax of an example picture parameter set with a variable num_slices_in_pic_minus2, according to some embodiments of the present disclosure.

FIG. 20 shows semantics of an example improved picture parameter set with a variable num_slices_in_pic_minus2, according to some embodiments of the present disclosure.

FIG. 21 shows syntax of an example picture parameter set with a variable num_slices_in_pic_minus_subpic_num_minus1, according to some embodiments of the present disclosure.

FIG. 22 shows semantics of an example improved picture parameter set with a variable num_slices_in_pic_minus_subpic_num_minus1, according to some embodiments of the present disclosure.

FIG. 23 shows syntax of an example updated slice header, according to some embodiments of the present disclosure.

DETAILED DESCRIPTION

Figure 1:
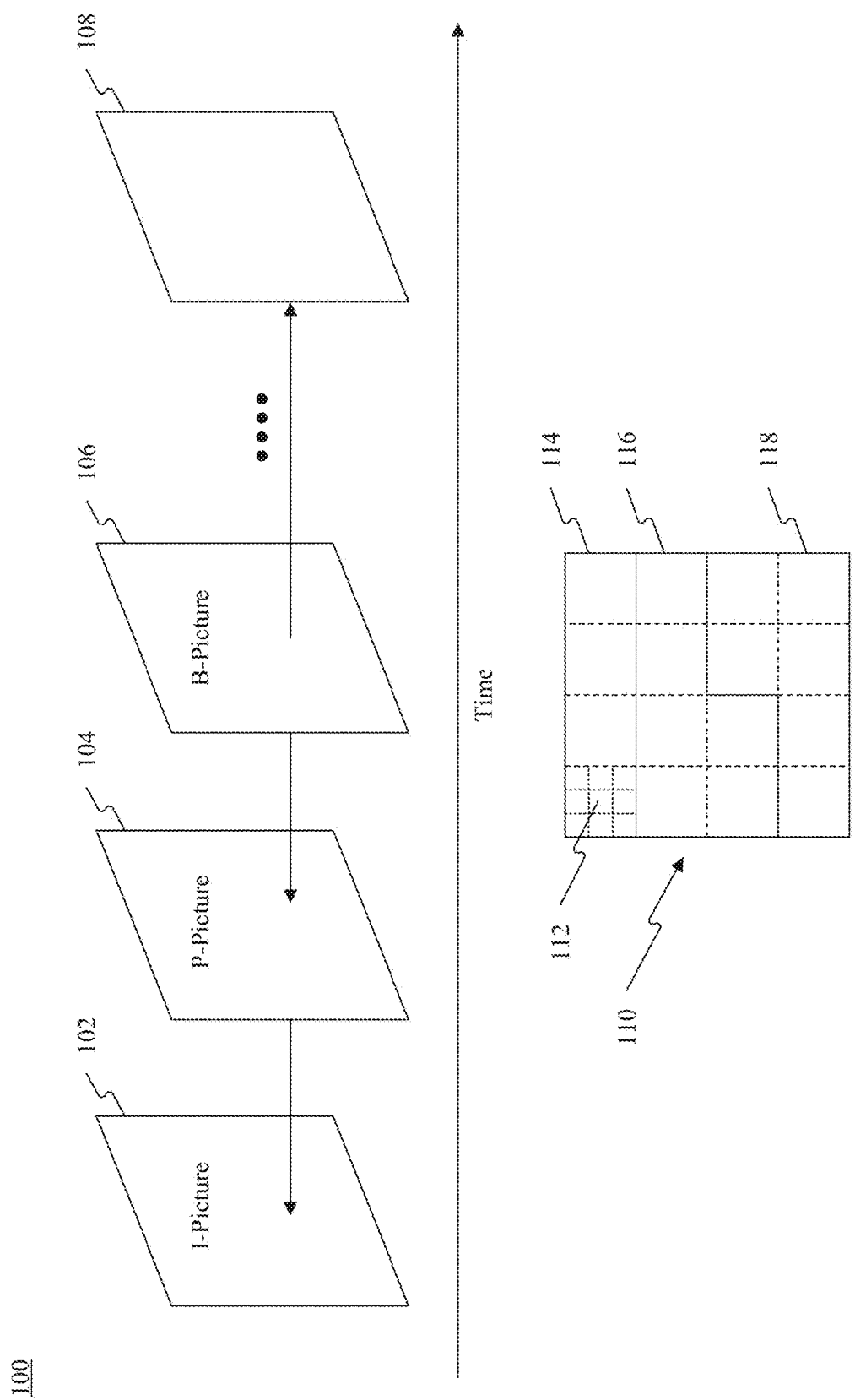
FIG. 1 shows structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the Joint Video Experts Team ("JVET") has been developing technologies beyond HEVC using the joint exploration model ("JEM") reference software. As coding technologies were incorporated into the JEM, the JEM achieved substantially higher coding performance than HEVC. The VCEG and MPEG have also formally started the development of a next generation video compression standard beyond HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 shows structures of an example video sequence, according to some embodiments of the present disclosure. As shown in FIG. 1, video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
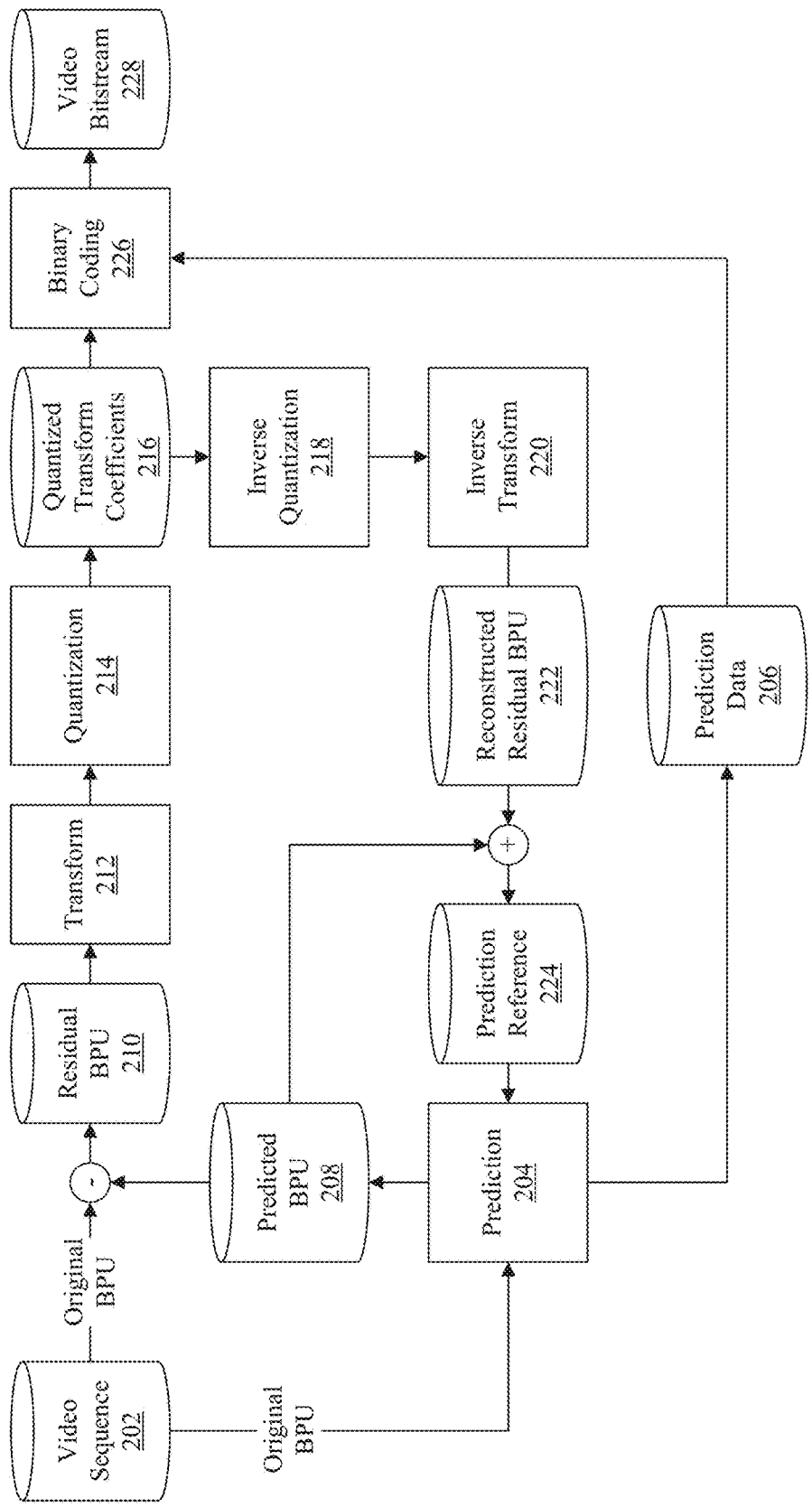
FIG. 2A shows a schematic of an example encoding process, according to some embodiments of the present disclosure.
Figure 2B:
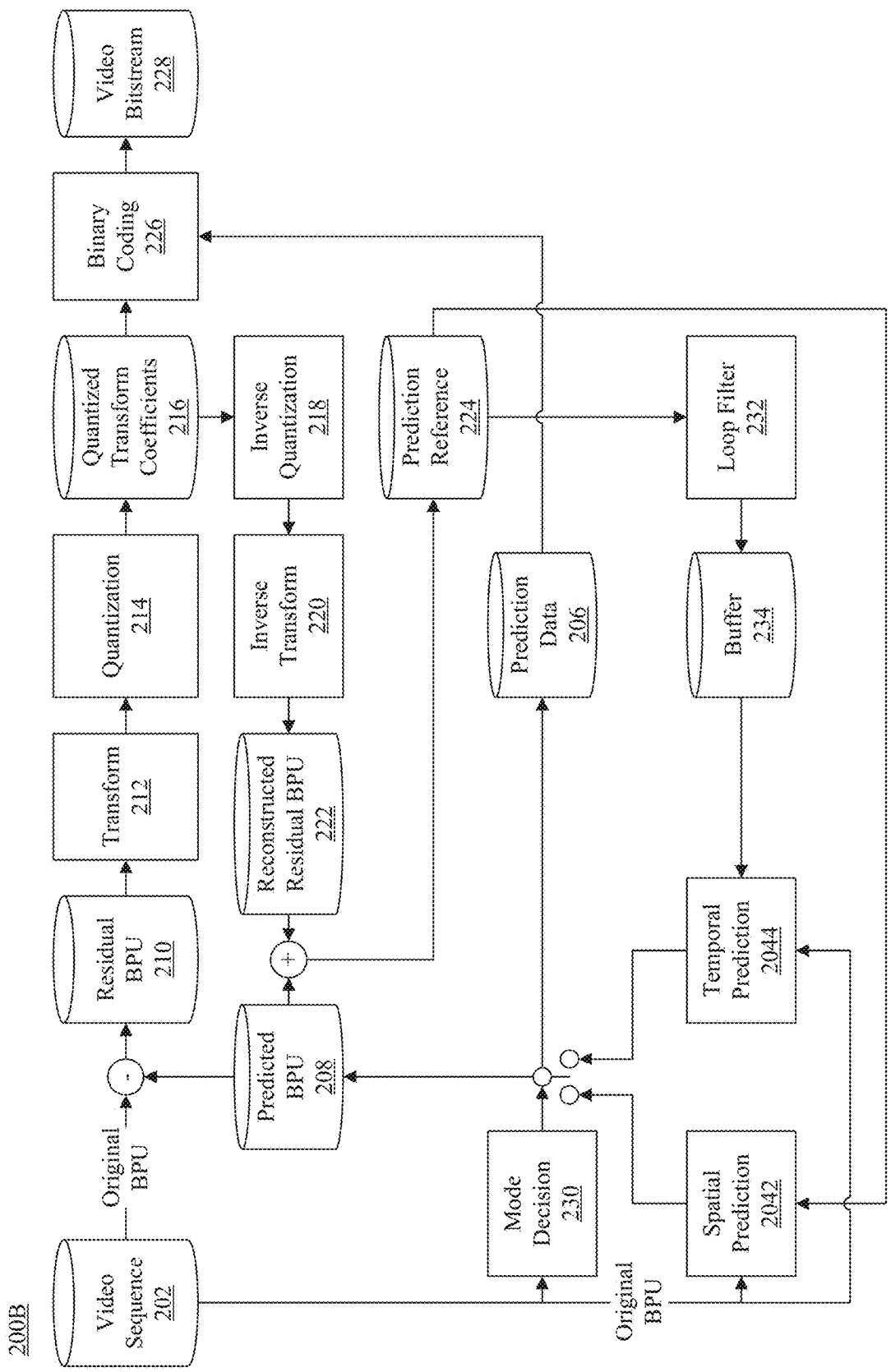
FIG. 2B shows a schematic of another example encoding process, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A shows a schematic of an example encoding process, according to some embodiments of the present disclosure. For example, encoding process 200A shown in FIG. 2A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization scale factor or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization scale factors), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B shows a schematic of another example encoding process, according to some embodiments of the present disclosure. As shown in FIG. 2B, process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
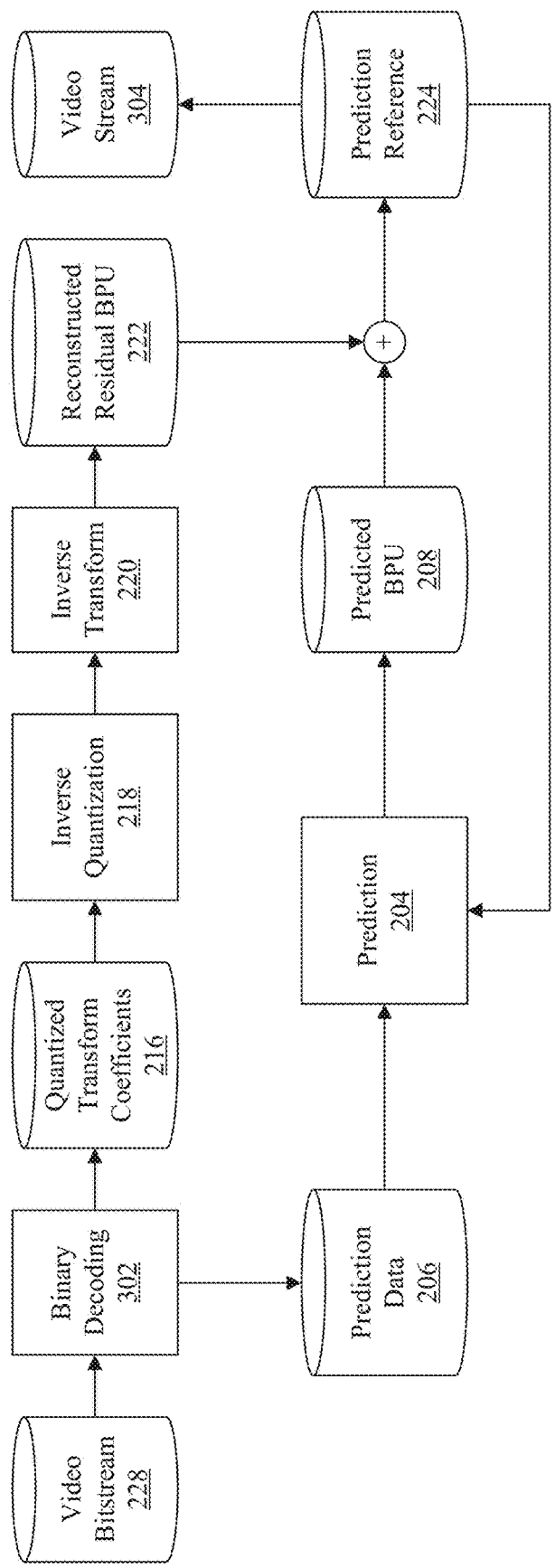
FIG. 3A shows a schematic of an example decoding process, according to some embodiments of the present disclosure.

FIG. 3A shows a schematic of an example decoding process, according to some embodiments of the present disclosure. As shown in FIG. 3A, process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization scale factors), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
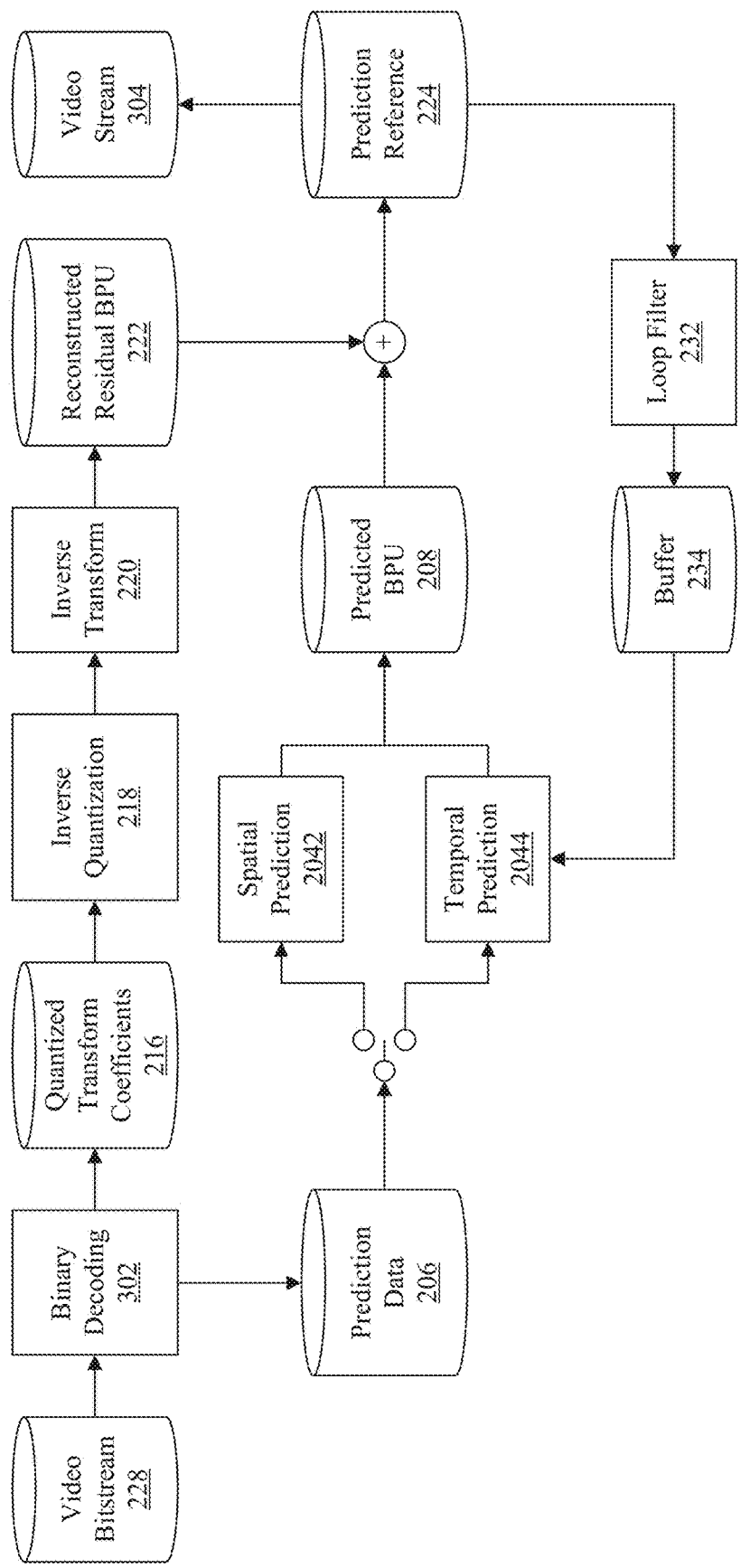
FIG. 3B shows a schematic of another example decoding process, according to some embodiments of the present disclosure.

FIG. 3B shows a schematic of another example decoding process, according to some embodiments of the present disclosure. As shown in FIG. 3B, process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 4:
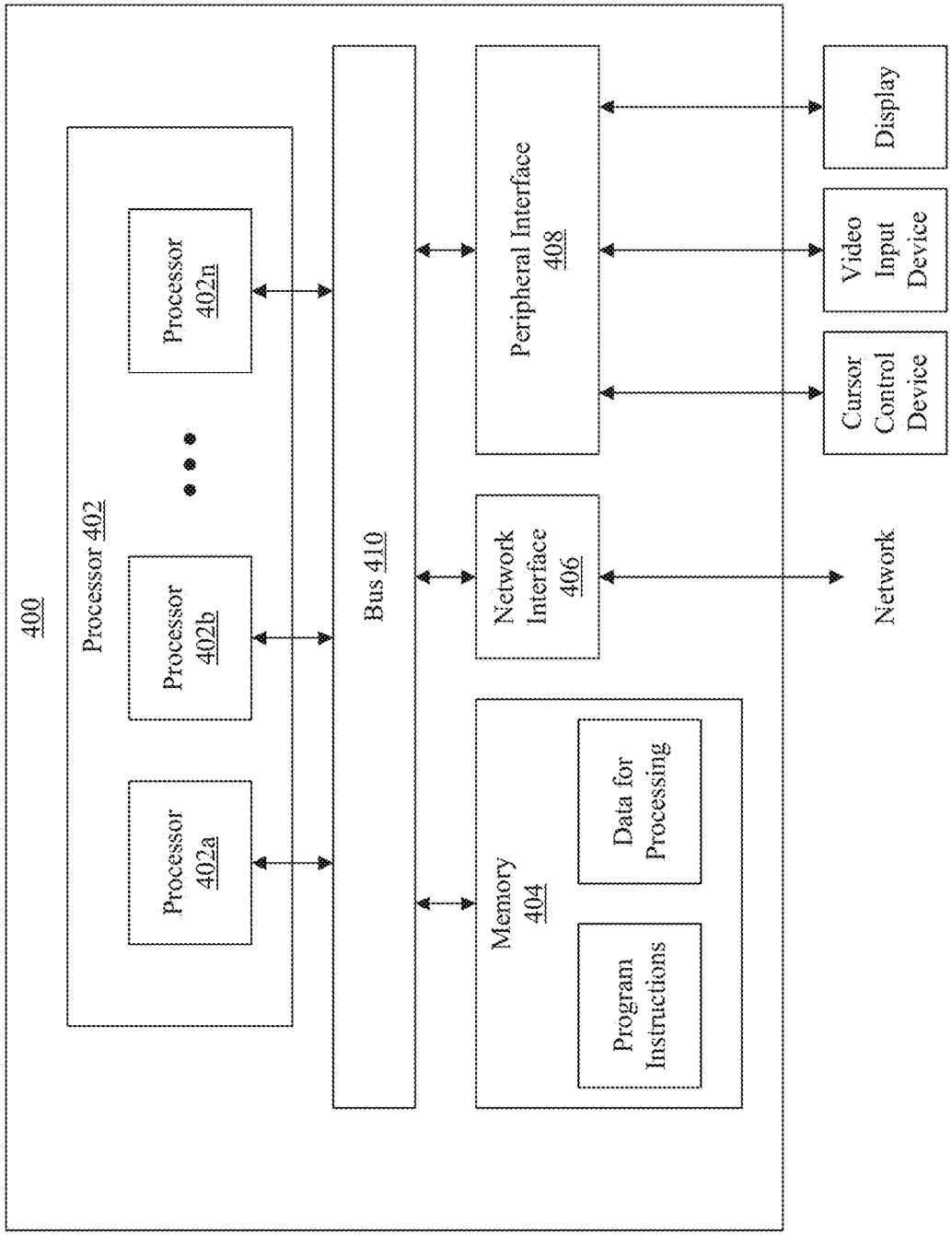
FIG. 4 shows a block diagram of an example apparatus for encoding or decoding a video, according to some embodiments of the present disclosure.

FIG. 4 shows a block diagram of an example apparatus for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like.

Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

An Equirectangular Projection ("ERP") format is a common projection format used to represent 360-degree videos and images. The projection maps meridians to vertical straight lines of constant spacing, and circles of latitude to horizontal straight lines of constant spacing. Because the particularly simple relationship between the position of an image pixel on the map and its corresponding geographic location on sphere, ERP is one of the most common projections used for 360-degree videos and images.

Algorithm description of projection format conversion and video quality metrics output by JVET gives the introduction and coordinate conversion between ERP and sphere. For 2D-to-3D coordinate conversion, given a sampling position (m, n), (u, v) can be calculated based on the following equations (1) and (2).

$$u=(m+0.5)/W, 0 \le m < W \qquad \text{Eq. (1)}$$

$$v=(n+0.5)/H, 0 \le n < H \qquad \text{Eq. (2)}$$

Then, the longitude and latitude (ϕ, θ) in the sphere can be calculated from (u, v) based on the following equations (3) and (4).

$$\phi=(u-0.5)\times(2\times\pi) \qquad \text{Eq. (3)}$$

$$\theta=(0.5-v)\times\pi \qquad \text{Eq. (4)}$$

3D Coordinates (X, Y, Z) can be calculated based on the following equations (5)-(7).

$$X=\cos(\theta)\cos(\phi) \qquad \text{Eq. (5)}$$

$$Y=\sin(\theta) \qquad \text{Eq. (6)}$$

$$Z=-\cos(\theta)\sin(\phi) \qquad \text{Eq. (7)}$$

For 3D-to-2D coordinate conversion starting from (X, Y, Z), (ϕ, θ) can be calculated based on the following equations (8) and (9). Then, (u, v) is calculated based on equations (3) and (4). Finally, 2D coordinates (m, n) can be calculated based on equations (1) and (2).

$$\phi=\tan^{-1}(-Z/X) \qquad \text{Eq. (8)}$$

$$\theta=\sin^{-1}(Y/(X^2+Y^2+Z^2)^{1/2}) \qquad \text{Eq. (9)}$$

To reduce the seam artifacts in reconstructed viewports that encompass the left and right boundaries of the ERP picture, a new format called padded equirectangular projection ("PERP") is provided by padding samples on each of the left and the right sides of the ERP picture.

When PERP is used to represent the 360-degree videos, the PERP picture is encoded. After decoding, the reconstructed PERP is converted back to reconstructed ERP by blending the duplicated samples or cropping the padded areas.

Figure 5A:
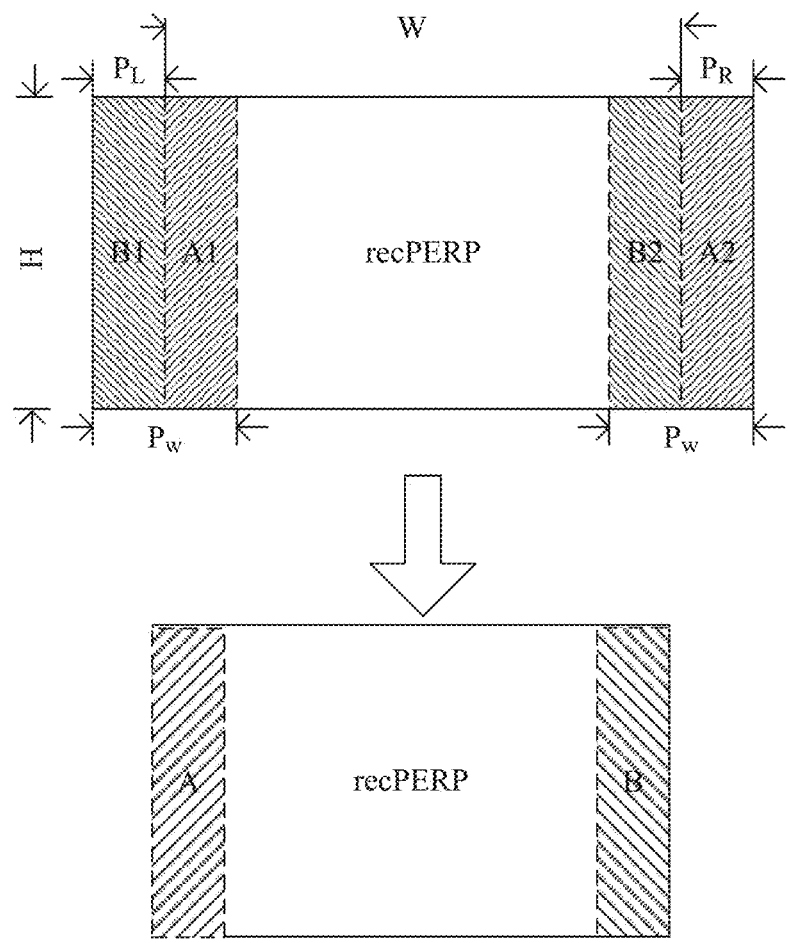
FIG. 5A shows a schematic of an example blending operation for generating reconstructed equirectangular projections, according to some embodiments of the present disclosure.

FIG. 5A shows a schematic of an example blending operation for generating reconstructed equirectangular projections, according to some embodiments of the present disclosure. Unless otherwise stated, "recPERP" is used to denote the reconstructed PERP before the post-processing, and "recERP" is used to denote the reconstructed ERP after the post-processing. In FIG. 5A, A1 and B2 are boundary areas within ERP picture, and B1 and A2 are padded areas where A2 is padded from A1 and B1 is padded from B2. As shown in FIG. 5A, the duplicated samples of the recPERP can be blended by applying a distance-based weighted averaging operation. For example, region A can be generated by blending regions A1 with A2, and region B is generated by blending regions B1 with B2.

In the following description, the width and height of unpadded recERP are denoted as "W" and "H" respectively. The left and right padding widths are denoted as "$P_L$" and "$P_R$" respectively. The total padding width is denoted as "$P_W$," which can be a sum of $P_L$ and $P_R$.

In some embodiments, recPERP can be converted to recERP via blending operations. For example, for a sample recERP(j, i) in A where (j,i) is the coordinate in ERP picture and i is in [0, $P_R$−1] and j is in [0, H−1], recERP (j, i) can be determined according to the following equations.

$$A = w \times A1 + (1-w) \times A2, \text{ where } w \text{ is from } P_L/P_W \text{ to } 1 \quad \text{Eq. (10)}$$

$$recERP(j, i) \text{ in } A = (recPERP(j, i+P_L) \times (i+P_L) + \quad \text{Eq. (11)}$$
$$recPERP(j, i+P_L+W) \times (P_R - i) + (Pw \gg 1))/Pw$$

where recPERP(y, x) is a sample on reconstructed PERP picture with (y, x) being the coordinate of the sample in PREP picture.

Figure 5B:
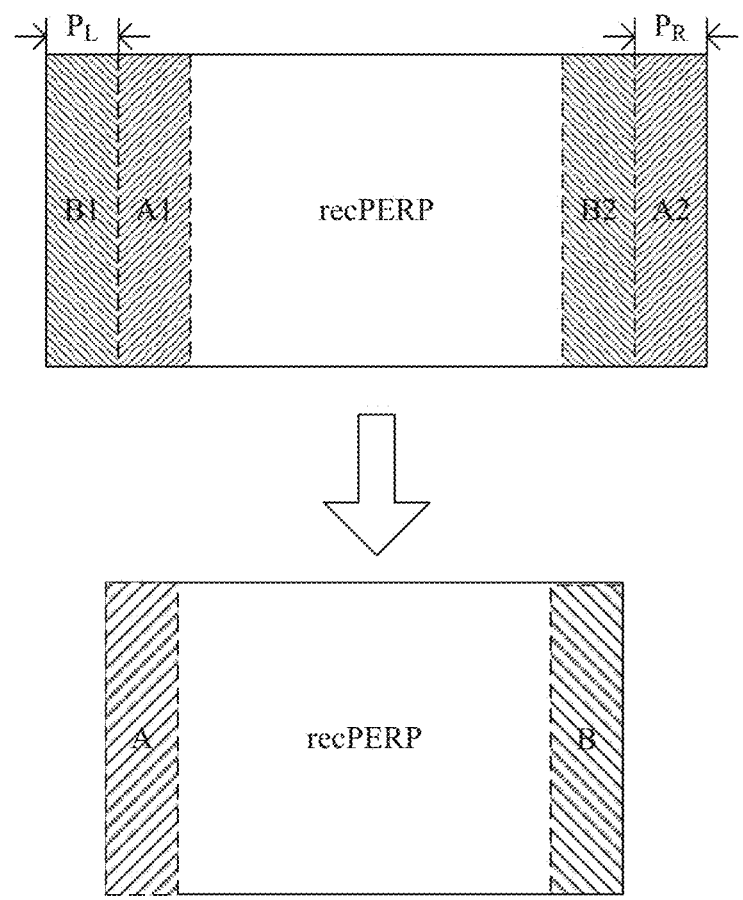
FIG. 5B shows schematic of an example cropping operation for generating reconstructed equirectangular projections, according to some embodiments of the present disclosure.

In some embodiments, for a sample recERP(j, i) in B where (j,i) is the coordinate in ERP picture and i is in [W−$P_L$, W−1] and j is in [0, H−1], recERP (j, i) can be generated according to the following equations.

$$B = k \times B1 + (1-k) \times B2, \text{ where } k \text{ is from } 0 \text{ to } P_L/P_W \quad \text{Eq. (12)}$$

$$recERP(j, i) \text{ in } B = (recPERP(j, i+P_L) \times (P_R - i + W) + \quad \text{Eq. (13)}$$
$$recPERP(j, i+P_L-w) \times (i-W+P_L) + (Pw \gg 1))/Pw$$

where recPERP(y, x) is a sample on reconstructed PERP picture with (y, x) is the coordinate of the sample in PREP picture FIG. 5B shows schematic of an example cropping operation for generating reconstructed equirectangular projections, according to some embodiments of the present disclosure. In FIG. 5B, A1 and B2 are boundary areas within ERP picture, and B1 and A2 are padded areas where A2 is padded from A1 and B1 is padded from B2. As shown in FIG. 5B, during the cropping process, the padded samples in recPERP can be directly discarded to obtain recERP. For example, padded samples B1 and A2 can be discarded.

In some embodiments, horizontal wrap-around motion compensation can be used to improve the coding performance of ERP. For example, the horizontal wrap-around motion compensation can be used in the VVC standard as a 360-specific coding tool designed to improve the visual quality of reconstructed 360-degree video in the ERP format or PERP format. In a conventional motion compensation, when a motion vector refers to samples beyond the picture boundaries of the reference picture, repetitive padding is applied to derive the values of the out-of-bounds samples by copying from those nearest neighbors on the corresponding picture boundary. For 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can be obtained from neighboring samples in the spherical domain. For a general projection format, it may be difficult to derive the corresponding neighboring samples in the spherical domain, because it involves 2D-to-3D and 3D-to-2D coordinate conversion, as well as sample interpolation for fractional sample positions. This problem can be resolved for the left and right boundaries of the ERP or PERP projection format, as the spherical neighbors outside of the left picture boundary can be obtained from samples inside the right picture boundary, and vice versa. Given the wide usage of the ERP or PERP projection format, and the relative ease of implementation, the horizontal wrap-around motion compensation was adopted to VVC to improve the visual quality of 360-degree video coded in the ERP or PERP projection format.

Figure 6A:
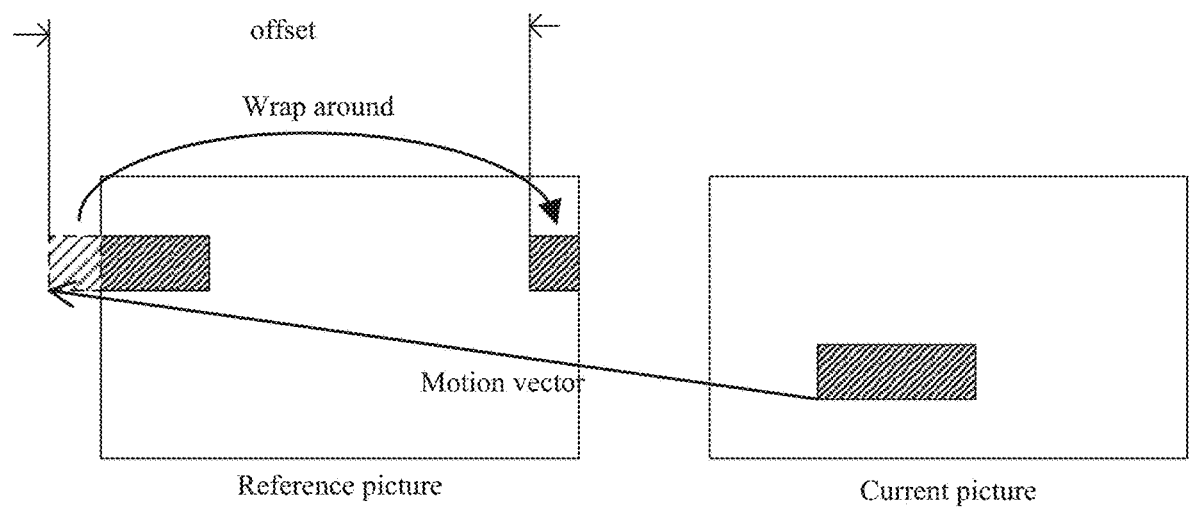
FIG. 6A shows a schematic of an example horizontal wrap-around motion compensation process for equirectangular projections, according to some embodiments of the present disclosure.

FIG. 6A shows a schematic of an example horizontal wrap-around motion compensation process for equirectangular projections, according to some embodiments of the present disclosure. As shown in FIG. 6A, when a part of the reference block is outside of the reference picture's left (or right) boundary in the projected domain, instead of repetitive padding, the "out-of-boundary" part can be taken from the corresponding spherical neighbors that are located within the reference picture toward the right (or left) boundary in the projected domain. In some embodiments, repetitive padding may be used for the top and bottom picture boundaries.

Figure 6B:
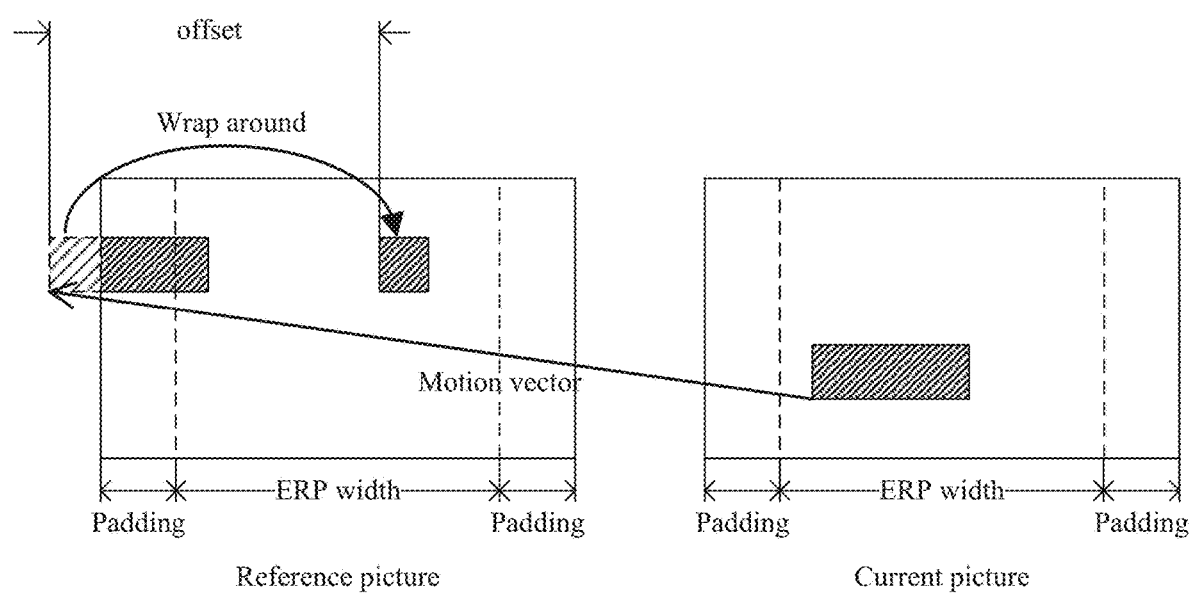
FIG. 6B shows a schematic of an example horizontal wrap-around motion compensation process for padded equirectangular projections, according to some embodiments of the present disclosure.

FIG. 6B shows a schematic of an example horizontal wrap-around motion compensation process for padded equirectangular projections, according to some embodiments of the present disclosure. As shown in FIG. 6B, the horizontal wrap-around motion compensation can be combined with a non-normative padding method that is often used in 360-degree video coding. In some embodiments, this is achieved by signaling a high-level syntax element to indicate the wrap-around motion compensation offset, which can be set to the ERP picture width before padding. This syntax can be used to adjust the position of horizontal wrap-around accordingly. In some embodiments, this syntax is not affected by a specific amount of padding on the left or right picture boundaries. As a result, this syntax can naturally support asymmetric padding of the ERP picture. In the asymmetric padding of the ERP picture, the left and right paddings can be different. In some embodiments, the wrap-around motion compensation can be determined according to the following equation:

$$pos_x\_wrap \begin{cases} pos_x + offset; & pos_x < 0 \\ pos_x - offset; & pos_x > picW - 1 \\ pos_x; & \text{otherwise} \end{cases} \quad \text{Eq. (14)}$$

where the offset can be a wrap-around motion compensation offset signaled in the bitstream, picW can be a picture width including the padding area before encoding, $pos_x$ can be a reference position determined by current block position and the motion vector, and the output of the equation $pos_x$_wrap can be an actual reference position where the reference block is from in the wrap-around motion compensation. To save the signaling overhead of the wrap-around motion compensation offset, it can be in unit of minimum luma coding block, thus the offset can be replaced with offset$_w$×MinCb-SizeY where offset$_w$ is the wrap-around motion compensation offset in unit of minimum luma coding block which is signaled in the bitstream and MinCbSizeY is the size of minimum luma coding block. In contrast, in a traditional motion compensation, the actual reference position where the reference block is from may be directly derived by clipping $pos_x$ within 0 to picW−1.

The horizontal wrap-around motion compensation can provide more meaningful information for motion compensation when the reference samples are outside of the reference picture's left and right boundaries. Under the 360-degree video common test conditions, this tool can improve compression performance not only in terms of rate-distortion, but also in terms of reduced seam artefacts and subjective quality of the reconstructed 360-degree video. The horizontal wrap-around motion compensation can also be used for other single face projection formats with constant sampling density in the horizontal direction, such as adjusted equal-area projection.

In VVC, (e.g., VVC draft 8), the wrap-around motion compensation can be achieved by signaling a high-level syntax variable pps_ref_wraparound_offset to indicate the wrap-around offset. Sometimes, the wrap-around offset should be set to the ERP picture width before padding. This syntax can be used to adjust the position of horizontal wrap-around motion compensation accordingly. This syntax may not be affected by the specific amount of padding on the left or right picture boundaries. As a result, this syntax can naturally support asymmetric padding of the ERP picture (e.g., when left and right padding are different). The horizontal wrap-around motion compensation can provide more meaningful information for motion compensation when the reference samples are outside of the reference picture's left and right boundaries.

FIG. 7 shows syntax of an example high level wrap-around offset, according to some embodiments of the present disclosure. It is appreciated that the syntax shown in FIG. 7 can be used in VVC (e.g., VVC draft 8). As shown in FIG. 7, when the wrap-around motion compensation is enabled (e.g., pps_ref_wraparound_enabled_flag=1), the wrap-around offset pps_ref_wraparound_offset can be directly signaled. As shown in FIG. 7, syntax elements or variables in a bitstream are shown in bold.

FIG. 8 shows semantics of an example high level wrap-around offset, according to some embodiments of the present disclosure. It is appreciated that the semantics shown in FIG. 8 can correspond to the syntax shown in FIG. 7. In some embodiments, as shown in FIG. 8, pps_ref_wraparound_enabled_flag having a value of 1 means that the horizontal wrap-around motion compensation is applied in inter prediction. If pps_ref_wraparound_enabled_flag has a value of 0, horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag should be equal to 0. When sps_ref_wraparound_enabled_flag is equal to 0, the value of pps_ref_wraparound_enabled_flag should be equal to 0. CtbSizeY is the size of the luma coding tree block.

In some embodiments, as shown in FIG. 8, the value of pps_ref_wraparound_offset plus (CtbSizeY/MinCbSizeY)+2 can specify the offset used for computing the horizontal wrap-around position in units of MinCbSizeY luma samples. The value of pps_ref_wraparound_offset can be in the range of 0 to (pic_width_in_luma_samples/MinCbSizeY)−(CtbSizeY/MinCbSizeY)−2, inclusive. A variable PpsRefWraparoundOffset can be set to be equal to pps_ref_wraparound_offset+(CtbSizeY/MinCbSizeY)+2. In some embodiments, variable PpsRefWraparoundOffset can be used to determine a luma location of a subblock (e.g., in VVC Draft 8).

In VVC (e.g., VVC draft 8), a picture can be divided into one or more tile rows or one or more tile columns. A tile can be a sequence of coding tree units ("CTUs") that covers a rectangular region of a picture. A slice can comprise an integer number of complete tiles or an integer number of consecutive complete CTU rows within a tile of a picture.

Two modes of slices can be supported, namely a raster-scan slice mode and a rectangular slice mode. In the raster-scan slice mode, a slice can comprise a sequence of complete tiles in a tile raster scan of a picture. In the rectangular slice mode, a slice can comprise either a number of complete tiles that collectively form a rectangular region of the picture, or a number of consecutive complete CTU rows of one tile that collectively form a rectangular region of the picture. Tiles within a rectangular slice are scanned in tile raster scan order within the rectangular region corresponding to that slice.

A subpicture can comprise one or more slices that collectively cover a rectangular region of a picture. FIG. 9 shows a schematic of an example slice and subpicture partitioning of a picture, according to some embodiments of the present disclosure. As shown in FIG. 9, the picture is partitioned into 20 tiles, with 5 tile columns and 4 tile rows. There are 12 tiles on the left side, each covering one slice of 4 by 4 CTUs. There are 8 tiles on the right side, each covering 2 vertically stacked slices of 2 by 2 CTUs. Altogether, there are 28 slices and 28 subpictures of varying dimensions (e.g., each slice can be a subpicture).

FIG. 10 shows a schematic of an example slice and subpicture partitioning of a picture having different slices and subpictures, according to some embodiments of the present disclosure. As shown in FIG. 10, the picture is partitioned into 20 tiles, with 5 tile columns and 4 tile rows. There are 12 tiles on the left, each covering one slice of 4 by 4 CTUs. There are 8 tiles on the right, each covering 2 vertically stacked slices of 2 by 2 CTUs. Altogether, there are 28 slices. For the 12 slices on the left, each slice is a subpicture. For the 16 slices on the right, each 4 slices form a subpicture. As a result, altogether there are 16 subpictures with same dimension.

In VVC (e.g., VVC draft 8), information regarding slice layouts can be signaled in a picture parameter set ("PPS"). In some embodiments, the picture parameter set is a syntax structure including syntax elements or variables that apply to zero or more entire coded pictures as determined by a syntax element found in each picture header. FIG. 11 shows syntax of an example picture parameter set for tile mapping and slice layouts, according to some embodiments of the present disclosure. It is appreciated that the syntax shown in FIG. 11 can be used in VVC (e.g., VVC draft 8). As shown in FIG. 11, syntax elements or variables in a bitstream are shown in bold. As shown in FIG. 11, if a number of tiles in a current picture is larger than 1 and the rectangular slice mode (e.g., rect_slice_flag==1) is used, a flag called single_slice_per_subpic_flag can be signaled first to indicate that each subpicture includes only one slice. In this case (e.g., single_slice_per_subpic_flag=1), there is no need to further signal the layout information of the slice, since it may be the same as the subpicture layout which is already signaled in a sequence parameter set ("SPS"). In some embodiments, the SPS is a syntax structure that includes syntax elements applied to zero or more entire coded layer video sequences ("CLVSs") as determined by the content of a syntax element found in a picture parameter set referred to by a syntax element found in each picture header. In some embodiments, the picture header is a syntax structure that includes syntax elements that apply to all slices of a coded picture. In some embodiments, as shown in FIG. 11, if single_slice_per_subpic_flag has a value of 0, the number of slices in the picture (e.g., num_slices_in_pic_minus1) can be signaled first followed by the slice position and dimension information for each slice.

In some embodiments, to signal the number of slices, slice number minus 1 (e.g., num_slices_in_pic_minus1) can be signaled instead of directly signaling the slice number, since there is at least 1 slice in a picture. Generally, signaling a smaller positive value can cost fewer bits and improve overall efficiency of executing the video processing.

FIG. 12 shows semantics of an example picture parameter set for tile mapping and slice layouts, according to some embodiments of the present disclosure. It is appreciated that the semantics shown in FIG. 12 can correspond to the syntax shown in FIG. 11. In some embodiments, semantics shown in FIG. 12 corresponds to VVC (e.g., VVC draft 8).

In some embodiments, as shown in FIG. 12, variable rect_slice_flag being equal to 0 means that tiles within each slice are in the raster scan order, and the slice information is not signaled in PPS. When variable rect_slice_flag is equal to 1, tiles within each slice can cover a rectangular region of the picture and the slice information can be signaled in the PPS. In some embodiments, when not present, variable rect_slice_flag can be inferred to be equal to 1. In some embodiments, when variable subpic_info_present_flag is equal to 1, the value of rect_slice_flag should be equal to 1.

In some embodiments, as shown in FIG. 12, variable single_slice_per_subpic_flag being equal to 1 mean that each subpicture can comprise one and only one rectangular slice. When variable single_slice_per_subpic_flag is equal to 0, each subpicture may comprise one or more rectangular slices. In some embodiments, when variable single_slice_per_subpic_flag is equal to 1, variable num_slices_in_pic_minus1 can be inferred to be equal to variable sps_num_subpics_minus1. In some embodiments, when not present, the value of single_slice_per_subpic_flag can be inferred to be equal to 0.

In some embodiments, as shown in FIG. 12, variable num_slices_in_pic_minus1 plus 1 is the number of rectangular slices in each picture referring to the PPS. In some embodiments, the value of num_slices_in_pic_minus1 can be in the range of 0 to MaxSlicesPerPicture−1, inclusive. In some embodiments, when variable no_pic_partition_flag is equal to 1, the value of num_slices_in_pic_minus1 can be inferred to be equal to 0.

In some embodiments, as shown in FIG. 12, if variable tile_idx_delta_present_flag is equal to 0, values of tile_idx_delta are not present in the PPS, and all rectangular slices in pictures referring to the PPS are specified in raster order. In some embodiments, when variable tile_idx_delta_present_flag is equal to 1, values of tile_idx_delta may be present in the PPS, and all rectangular slices in pictures referring to the PPS are specified in the order indicated by the values of tile_idx_delta. In some embodiments, when not present, the value of tile_idx_delta_present_flag can be inferred to be equal to 0.

In some embodiments, as shown in FIG. 12, variable slice_width_in_tiles_minus1[i] plus 1 specifies the width of the i-th rectangular slice in units of tile columns. In some embodiments, the value of slice_width_in_tiles_minus1[i] should be in the range of 0 to NumTileColumns−1, inclusive. In some embodiments, if slice_width_in_tiles_minus1[i] is not present, the following can apply: if NumTileColumns is equal to 1, the value of slice_width_in_tiles_minus1[i] can be inferred to be equal to 0; otherwise, the value of slice_width_in_tiles_minus_1[i] can be inferred as specified in a clause in VVC draft (e.g., VVC draft 8).

In some embodiments, as shown in FIG. 12, variable slice_height_in_tiles_minus1 plus 1 specifies the height of the i-th rectangular slice in units of tile rows. In some embodiments, the value of slice_height_in_tiles_minus1[i] should be in the range of 0 to NumTileRows−1, inclusive. In some embodiments, when variable slice_height_in_tiles_minus1[i] is not present, the following applies: if NumTileRows is equal to 1, or variable tile_idx_delta_present_flag is equal to 0 and tileIdx % NumTileColumns is greater than 0, the value of slice_height_in_tiles_minus1[i] is inferred to be equal to 0; otherwise (e.g., NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] can be inferred to be equal to slice_height_in_tiles_minus1[i−1].

In some embodiments, as shown in FIG. 12, the value of num_exp_slices_in_tile[i] specifies the number of explicitly provided slice heights in the current tile that comprises more than one rectangular slice. In some embodiments, the value of num_exp_slices_in_tile[i] should be in the range of 0 to RowHeight[tileY]−1, inclusive, where tileY is the tile row index comprising the i-th slice. In some embodiments, when not present, the value of num_exp_slices_in tile[i] can be inferred to be equal to 0. In some embodiments, when num_exp_slices_in_tile[i] is equal to 0, the value of the variable NumSliceInTile[i] is derived to be equal to 1.

In some embodiments, as shown in FIG. 12, the value of exp_slice_height_in_ctus_minus1[j] plus 1 specifies the height of the j-th rectangular slice in the current tile in units of CTU rows. In some embodiments, the value of exp_slice_height_in_ctus_minus1[j] should be in the range of 0 to RowHeight[tileY]−1, inclusive, where tileY is the tile row index of the current tile.

In some embodiments, as shown in FIG. 12, when variable num_exp_slices_in_tile[i] is greater than 0, variable NumSlicesInTile[i] and SliceHeightInCtusMinus1[i+k] for k in the range of 0 to NumSlicesInTile[i]−1 can be derived. In some embodiments, as shown in FIG. 8, values of NumSlicesInTile[i] and SliceHeightInCtusMinus1[i+k] can be derived when the value of num_exp_slices_in tile[i] is greater than 0.

In some embodiments, as shown in FIG. 12, the value of tile_idx_delta[i] specifies the difference between the tile index of the first tile in the i-th rectangular slice and the tile index of the first tile in the (i+1)-th rectangular slice. The value of tile_idx_delta[i] should be in the range of −NumTilesInPic+1 to NumTilesInPic−1, inclusive. In some embodiments, when not present, the value of tile_idx_delta[i] can be inferred to be equal to 0. In some embodiments, when present, the value of tile_idx_delta[i] can be inferred to not be equal to 0.

In VVC (e.g., VVC draft 8), to locate each slice in the picture, one or more slice addresses can be signaled in slice header. FIG. 13 shows syntax of an example slice header, according to some embodiments of the present disclosure. It is appreciated that the syntax shown in FIG. 13 can be used in VVC (e.g., VVC draft 8). As shown in FIG. 11, syntax elements or variables in a bitstream are shown in bold. As shown in FIG. 13, if variable picture_header_in_slice_header_flag is equal to 1, the picture header syntax structure is present in the slice header.

FIG. 14 shows semantics of an example slice header, according to some embodiments of the present disclosure. It is appreciated that the semantics shown in FIG. 14 can correspond to the syntax shown in FIG. 13. In some embodiments, semantics shown in FIG. 14 corresponds to VVC (e.g., VVC draft 8).

In some embodiments, as shown in FIG. 14, it is a requirement of bitstream conformance that the value of picture_header_in_slice_header_flag should be the same in all coded slices in a CLVS.

In some embodiments, as shown in FIG. 14, when variable picture_header_in_slice_header_flag is equal to 1 for a coded slice, it is a requirement of bitstream conformance that no video coding layer ("VCL") network abstraction layer ("NAL") unit with nal_unit_type equal to PH_NUT should be present in the CLVS.

In some embodiments, as shown in FIG. 14, when picture_header_in_slice_header_flag is equal to 0, all coded slices in the current picture should have picture_header_in_slice_header_flag being equal to 0, and the current PU should have a PH NAL unit.

In some embodiments, as shown in FIG. 14, variable slice_address can specify the slice address of the slice. In some embodiments, when not present, the value of slice_address can be inferred to be equal to 0. When variable rect_slice_flag is equal to 1 and NumSliceInSubpic[CurrSubpicIdx] is equal to 1, the value of slice_address is inferred to be equal to 0.

In some embodiments, as shown in FIG. 14, if variable rect_slice_flag is equal to 0, the following can apply: the slice address can be the raster scan tile index; the length of slice_address can be ceil (Log 2 (NumTilesInPic)) bits; and the value of slice_address should be in the range of 0 to NumTilesInPic−1, inclusive.

In some embodiments, as shown in FIG. 14, it is a requirement of bitstream conformance that the following constrains apply: if variable rect_slice_flag is equal to 0 or variable subpic_info_present_flag is equal to 0, the value of slice_address should not be equal to the value of slice_address of any other coded slice NAL unit of the same coded picture; otherwise, the pair of slice_subpic_id and slice_address values should not be equal to the pair of slice_subpic_id and slice_address values of any other coded slice NAL unit of the same coded picture.

In some embodiments, as shown in FIG. 14, the shapes of the slices of a picture should be such that each CTU, when decoded, should have its entire left boundary and entire top boundary including a picture boundary or including boundaries of previously decoded CTU(s).

In some embodiments, as shown in FIG. 14, variable slice_address may only be signaled if one of the following two conditions are satisfied: rectangular slice mode is used and a number of slice(s) in current subpicture is larger than 1; or rectangular slice mode is not used and the number of tiles in current picture is larger than 1. In some embodiments, if none of the above two conditions are satisfied, there is only one slice either in current subpicture or current picture. In that case, there is no need to signal the slice address since the whole subpicture or the whole picture is single slice.

There are many issues with the current design of the VVC. First, the wraparound offset pps_ref_wraparound_offset is signaled in bitstream, and it should be set to ERP picture width before padding. To save bits, the minimum value of wraparound offset (e.g., CtbSizeY/MinCbSizeY)+2) is subtracted from the wraparound offset before signaling. However, the width of the padding area is much less than the width of the original ERP picture. This is especially true for coding ERP pictures where the width of padding area can be 0. Given that the total width of the picture to be encoded or decoded is known, signaling width of the original ERP part can cost more bits than signaling width of the padding area. As a result, the current signaling of wraparound offset which signals the original ERP width in units of MinCbSizeY is not efficient.

Moreover, the slice layout signaling can also be improved. For example, 1 is subtracted from the number of slices before signaling the number of slices, since the number of slices in a picture is always larger than or equal to one, and signaling a smaller positive value takes fewer bits. However, in the current VVC (e.g., VVC draft 8), a subpicture includes an integer number of complete slices. As a result, the number of slices in a picture is larger than or equal to the number of subpictures in a picture. In the current VVC (e.g., VVC draft 8), the num_slices_in_pic_minus1 is only signaled when variable single_slice_per_subpic_flag is 0, and variable single_slice_per_subpic_flag being equal to 0 means there is at least one subpicture containing more than one slice. So in this case, the slice number must be larger than the subpicture number of which the minimum value is one. As a result, the minimum value of num_slices_in_pic_minus1 is larger than zero. Signaling a non-negative value whose range is not from zero is not efficient.

Furthermore, there are other issues with the slice address signaling. When there is only one slice in the current picture, there may not be a need to signal slice address, since the whole subpicture or the whole picture is a single slice. The slice address can be inferred to be 0. However, the two conditions to skip the slice address signaling are not complete. For example, in the raster-scan slice mode, even the number of tiles is larger than one, there can be only one slice which includes all the tiles in the picture, in which case slice address signaling can be avoided as well.

Embodiments of the present disclosure provide methods to combat the issues described above. In some embodiments, since the width of the padding area is usually less than the width of the original ERP picture which may be the same as the wraparound offset in the wrap-around motion compensation, it can be proposed to signal a difference between the coded picture width and the original ERP picture width in the bitstream. For example, it can be proposed to signal a difference between the coded picture width and the wraparound motion compensation offset in the bitstream and to perform a deduction after parsing the signaled difference to get the wraparound offset on the decoder side. Since the difference between the coded picture width and the wraparound offset is usually less than the wraparound offset itself, this method can save signaled bits.

FIG. 15 shows syntax of an example improved picture parameter set, according to some embodiments of the present disclosure. As shown in FIG. 15, syntax elements or variables in a bitstream are shown in bold, and changes from the previous VVC (e.g., syntax shown in FIG. 7) are shown in italic type, with proposed deleted syntax being further shown in strikethrough. As shown in FIG. 15, a new variable pps_pic_width_minus_wraparound_offset can be created. The value of variable pps_pic_width_minus_wraparound_offset can be signaled according to the value of pps_ref_wraparound_enabled_flag. In some embodiments, new variable pps_pic_width_minus_wraparound_offset can replace variable pps_ref_wraparound_offset in the original VVC (e.g., VVC draft 8).

FIG. 16 shows semantics of an example improved picture parameter set, according to some embodiments of the present disclosure. As shown in FIG. 16, changes from the previous VVC (e.g., semantics shown in FIG. 8) are shown in italic type, with proposed deleted syntax being further shown in strikethrough. It is appreciated that the semantics shown in FIG. 16 can correspond to the syntax shown in FIG. 15. In some embodiments, semantics shown in FIG. 16 corresponds to VVC (e.g., VVC draft 8).

As shown in FIG. 16, the semantics for the new variable pps_pic_width_minus_wraparound_offset is different from variable pps_ref_wraparound_offset (e.g., as shown in FIG. 8). Variable pps_pic_width_minus_wraparound_offset can specify the difference between the picture width and the offset used for computing the horizontal wrap-around position in units of MinCbSizeY luma samples. In some embodiments, as shown in FIG. 16, the value of pps_pic_width_minus_wraparound_offset should be less than or equal to (pic_width_in_luma_samples/MinCbSizeY)−(CtbSizeY/MinCbSizeY)−2. In some embodiments, the variable PpsRefWraparoundOffset can be set to be equal to pic_width_in_luma_samples/MinCbSizeY−pps_pic_width_minus_wraparound_offset.

In some embodiments, a flag wraparound_offset_type can be signaled to indicate whether the signaled wraparound offset value is the original ERP picture width or the difference between the coded picture width and the original ERP picture width. The encoder may select the a smaller one from these two values and signal it in the bitstream, so that the signaling overhead may be further reduced. FIG. 17 shows syntax of an example picture parameter set with a variable wraparound_offset_type, according to some embodiments of the present disclosure. As shown in FIG. 17, syntax elements or variables in a bitstream are shown in bold, and changes from the previous VVC (e.g., syntax shown in FIG. 7) are shown in italic type. As shown in FIG. 17, a new variable pps_ref_wraparound_offset can be added to specify the value used to determine PpsRefWraparoundOffset.

FIG. 18 shows semantics of an example improved picture parameter set with a variable wraparound_offset_type, according to some embodiments of the present disclosure. As shown in FIG. 18, changes from the previous VVC (e.g., semantics shown in FIG. 8) are shown in italic type, with proposed deleted syntax being further shown in strikethrough. It is appreciated that the semantics shown in FIG. 18 can correspond to the syntax shown in FIG. 17. In some embodiments, semantics shown in FIG. 18 corresponds to VVC (e.g., VVC draft 8).

In some embodiments, as shown in FIG. 18, a new variable wraparound_offset_type can be added to specify the type of variable pps_ref_wraparound_offset.

The value of pps_ref_wraparound_offset should be in the range of 0 to ((pps_pic_width_in_luma_samples/MinCbSizeY)−(CtbSizeY/MinCbSizeY)−2)/2.

In some embodiments, as shown in FIG. 18, the value of variable PpsRefWraparoundOffset can be derived. For example, when variable wraparound_offset_type is equal to 0, the signaled wraparound offset value is the original ERP picture width. As a result, variable PpsRefWraparoundOffset is equal to pps_ref_wraparound_offset+(CrbSizeY/MinCbSizeY)+2. When variable wraparound_offset_type is not equal to 0, the signaled wraparound offset value is the difference between the coded picture width and the original ERP picture width. As a result, variable PpsRefWraparoundOffset is equal to pps_pic_width_in_luma_samples/MinCbSizeY−pps_ref_wraparound_offset.

In previous VVC (e.g., VVC draft 8), the number of slices is signaled in the PPS when variable single_slice_per_subpic_flag is 0, meaning that there is at least one subpicture containing more than one slice. In this case, the number of slices needs to be larger than the number of subpictures considering that each subpicture should contain one or more complete slices, which consequently results in the minimum number of slices being 2. This is because there is at least one subpicture in one picture.

Embodiments of the present disclosure provide methods to improve the signaling of the slice numbers. FIG. 19 shows syntax of an example picture parameter set with a variable num_slices_in_pic_minus2, according to some embodiments of the present disclosure. As shown in FIG. 19, syntax elements or variables in a bitstream are shown in bold, and changes from the previous VVC (e.g., syntax shown in FIG. 11) are shown in italic type, with proposed deleted syntax being further shown in strikethrough. As shown in FIG. 19, a new variable num_slices_in_pic_minus2 can be added to specify the value used to determine PpsRefWraparoundOffset.

FIG. 20 shows semantics of an example improved picture parameter set with a variable num_slices_in_pic_minus2, according to some embodiments of the present disclosure. As shown in FIG. 20, changes from the previous VVC (e.g., semantics shown in FIG. 12) are shown in italic type, with proposed deleted syntax being further shown in strikethrough. It is appreciated that the semantics shown in FIG. 20 can correspond to the syntax shown in FIG. 19. In some embodiments, semantics shown in FIG. 20 corresponds to VVC (e.g., VVC draft 8).

In some embodiments, as shown in FIG. 20, the value of variable num_slices_in_pic_minus2 plus 2 can specify the number of rectangular slices in each picture referring to the PPS. In some embodiments, as shown in FIG. 20, variable num_slices_in_pic_minus2 can replace variable num_slices_in_pic_minus_1. In some embodiments, the value of num_slices_in_pic_minus2 plus 2 should be in the range of 0 to MaxSlicesPerPicture−2, inclusive, where MaxSlicesPerPicture is specified in VVC (e.g., VVC draft 8). When variable no_pic_partition_flag is equal to 1, the value of num_slices_in_pic_minus2 is inferred to be equal to −1.

In some embodiments, slice numbers can be signaled using a variable of slice number minus subpicture number and then minus 1 (e.g., num_slices_in_pic_minus_subpic_num_minus1). FIG. 21 shows syntax of an example picture parameter set with a variable num_slices_in_pic_minus_subpic_num_minus1, according to some embodiments of the present disclosure. As shown in FIG. 21, syntax elements or variables in a bitstream are shown in bold, and changes from the previous VVC (e.g., syntax shown in FIG. 11) are shown in italic type, with proposed deleted syntax being further shown in strikethrough.

FIG. 22 shows semantics of an example improved picture parameter set with a variable num_slices_in_pic_minus_subpic_num_minus1, according to some embodiments of the present disclosure. As shown in FIG. 22, changes from the previous VVC (e.g., semantics shown in FIG. 12) are shown in italic type, with proposed deleted syntax being further shown in strikethrough. It is appreciated that the semantics shown in FIG. 22 can correspond to the syntax shown in FIG. 21. In some embodiments, semantics shown in FIG. 22 corresponds to VVC (e.g., VVC draft 8).

In VVC (e.g., VVC draft 8), the number of slices is signaled in PPS only if variable single_slice_per_subpic_flag is equal to 0 which can be equivalent to stating that there is at least one subpicture containing more than one slice. Therefore, the number of slices should be larger than the number of subpictures since a subpicture should contain one or more complete slices. As a result, the minimum slice number is equal to the number of subpictures plus 1. As shown in FIG. 21 and FIG. 22, slice number minus subpicture number and then minus 1 (e.g., num_slices_in_pic_minus_subpic_num_minus1) is signaled instead of slice number minus 1 (e.g., num_slices_in_pic_minus1) to reduce the signaled bit number.

In some embodiments, as shown in FIG. 22, the value of num_slices_in_pic_minus_subpic_num_minus1 plus subpicture number and plus 1 can specify the number of rectangular slices in each picture referring to the PPS. In some embodiments, the value of num_slices_in_pic_minus_subpic_num_minus1 should be in a range of 0 to MaxSlicesPerPicture minus sps_num_subpics_minus1 minus 2, inclusive, where MaxSlicesPerPicture can be specified in VVC (e.g., VVC draft 8). In some embodiments, the value of num_slices_in_pic_minus_subpic_num_minus1 can be inferred to be equal to (sps_num_subpics_minus1+1) when variable no_pic_partition_flag is equal to 1. In some embodiments, variable SliceNumInPic can be derived as SliceNumInPic=num_slices_in_pic_minus_subpic_num_minus1+sps_num_subpics_minus1+2.

Embodiments of the present disclosure further provide a novel way to signal the slice address. FIG. 23 shows syntax of an example updated slice header, according to some embodiments of the present disclosure. As shown in FIG. 23, syntax elements or variables in a bitstream are shown in bold, and changes from the previous VVC (e.g., syntax shown in FIG. 13) are shown in italic type, with proposed deleted syntax being further shown in strikethrough.

In some embodiments, as shown in FIG. 23, variable picture_header_in_slice_header_flag can be signaled in the slice header to indicate whether the PH syntax structure is present within the slice header. In VVC (e.g., VVC draft 8), there is constraint on the presence of the PH syntax structure in the slice header and the number of slices in one picture. When the PH syntax structure is present in the slice header, the picture should have only one slice. Therefore, there is also no need to signal slice address. As a result, the signaling of slice address can be conditioned on picture_header_in_slice_header_flag. As shown in FIG. 23, the value of picture_header_in_slice_header_flag can be used as another condition to decide whether to signal variable slice_address or not. The signaling of variable slice_address is skipped when picture_header_in_slice_header_flag is equal to 1. In some embodiments, when variable slice_address is not signaled, it can be inferred to be 0.

Figure 24:
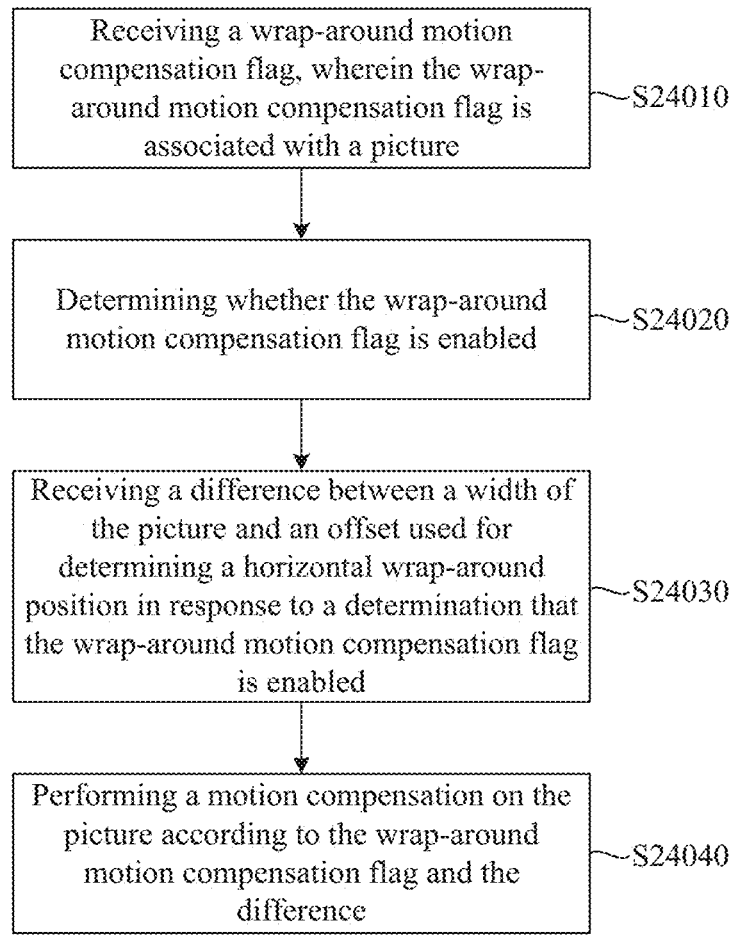
FIG. 24 shows a flowchart of an example video coding method with a variable signaling a difference between a width of a video frame and an offset used for computing a horizontal wrap-around position, according to some embodiments of the present disclosure.

Embodiments of the present disclosure further provide methods for performing video coding. FIG. 24 shows a flowchart of an example video coding method with a variable signaling a difference between a width of a video frame and an offset used for computing a horizontal wrap-around position, according to some embodiments of the present disclosure. In some embodiments, method 24000 shown in FIG. 24 can be performed by apparatus 400 shown in FIG. 4. In some embodiments, method 24000 shown in FIG. 24 can be executed according to the syntax shown in FIG. 15 or semantics shown in FIG. 16. In some embodiments, method 24000 shown in FIG. 24 includes a wrap-around motion compensation process performed according to the VVC standard. In some embodiments, method 24000 shown in FIG. 24 can be performed with a 360-degree video sequence as input.

In step S24010, a wrap-around motion compensation flag is received, wherein the wrap-around motion compensation flag is associated with a picture. For example, as shown in FIG. 15 or FIG. 16, the wrap-around motion compensation flag can be variable pps_ref_wraparound_enabled_flag. In some embodiments, the picture is in a bitstream. In some embodiments, the picture is a part of a 360-degree video.

In step S24020, it is determined whether the wrap-around motion compensation flag is enabled. For example, as shown in FIG. 15, it is determined if variable pps_ref_wraparound_enabled_flag is equal to 1.

In step S24030, in response to a determination that the wrap-around motion compensation flag is enabled, a difference between a width of the picture and an offset used for determining a horizontal wrap-around position is received. For example, as shown in FIG. 15, when it is determined that variable pps_ref_wraparound_enabled_flag is equal to 1, variable pps_pic_width_minus_wraparound_offset can be received or signaled. In some embodiments, the difference is less than or equal to the width of the picture divided by a size of a minimum luma coding block minus a size of luma coding tree block divided by the size of the minimum luma coding block minus 2.

In some embodiments, in S24030, receiving the difference includes receiving a wraparound offset type flag. For example, as shown in FIG. 17 and FIG. 18, a flag wraparound_offset_type can be signaled to indicate whether the signaled wraparound offset value is the original ERP picture width or the difference between the coded picture width and the original ERP picture width. In some embodiments, as shown in FIG. 17 and FIG. 18, flag wraparound_offset_type can be of values 0 or 1.

In step S24040, a motion compensation on the picture is performed according to the wrap-around motion compensation flag and the difference. For example, the motion compensation on the picture can be performed according to variables pps_ref_wraparound_enabled_flag and pps_pic_width_minus_wraparound_offset shown in FIG. 15 and FIG. 16. In some embodiments, performing the motion compensation also includes determining a wraparound motion compensation offset according to the width of the picture and the difference and performing the motion compensation on the picture according to the wraparound motion compensation offset. In some embodiments, the wraparound motion compensation offset can be determined as the width of the picture divided by a size of a minimum luma coding block minus the difference.

Figure 25:
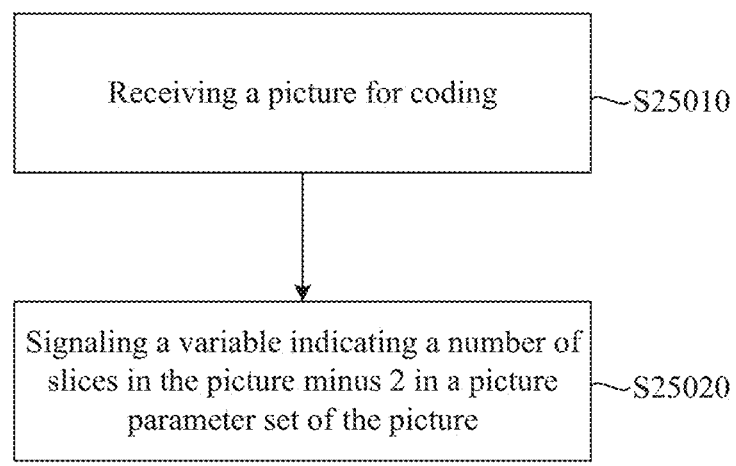
FIG. 25 shows a flowchart of an example video coding method with a variable signaling a number of slices in a video frame minus 2, according to some embodiments of the present disclosure.

FIG. 25 shows a flowchart of an example video coding method with a variable signaling a number of slices in a video frame minus 2, according to some embodiments of the present disclosure. In some embodiments, method 25000 shown in FIG. 25 can be performed by apparatus 400 shown in FIG. 4. In some embodiments, method 25000 shown in FIG. 25 can be executed according to the syntax shown in FIG. 19 or semantics shown in FIG. 20. In some embodiments, method 25000 shown in FIG. 25 can be performed according to the VVC standard.

In step S25010, a picture is received for coding. In some embodiments, the picture can comprise one or more slices. In some embodiments, the picture is in a bitstream. In some embodiments, the one or more slices are rectangular slices.

In step S25020, a variable indicating a number of slices in the picture minus 2 is signaled in a picture parameter set of the picture. For example, the variable can be num_slices_in_pic_minus2 shown in FIG. 19 or FIG. 20. In some embodiments, the value of the variable plus 2 can specify the number of rectangular slices in each picture. In some embodiments, the variable is a part of the PPS. In some embodiments, similar to the semantics shown in FIG. 20, variable num_slices_in_pic_minus2 can replace variable num_slices_in_pic_minus_1.

Figure 26:
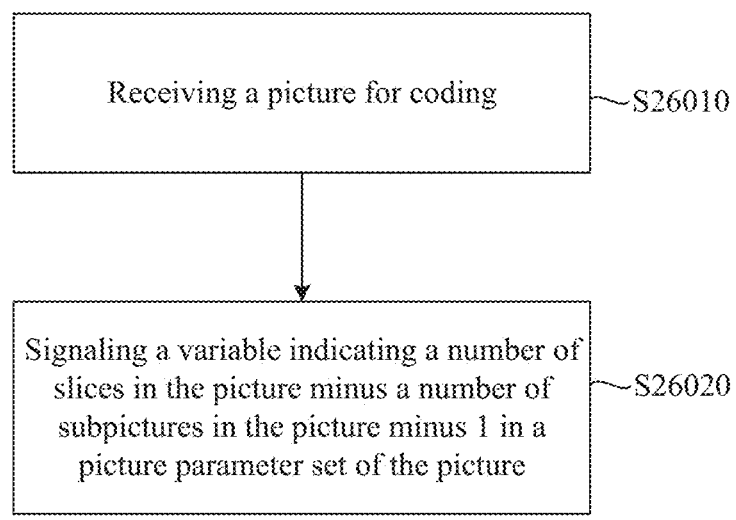
FIG. 26 shows a flowchart of an example video coding method with a variable signaling a variable indicating a number of slices in the video frame minus a number of subpictures in the video frame minus 1, according to some embodiments of the present disclosure.

FIG. 26 shows a flowchart of an example video coding method with a variable signaling a variable indicating a number of slices in the video frame minus a number of subpictures in the video frame minus 1, according to some embodiments of the present disclosure. In some embodiments, method 26000 shown in FIG. 26 can be performed by apparatus 400 shown in FIG. 4. In some embodiments, method 26000 shown in FIG. 26 can be executed according to the syntax shown in FIG. 21 or semantics shown in FIG. 22. In some embodiments, method 26000 shown in FIG. 26 can be performed according to the VVC standard.

In step S26010, a picture is received for coding. In some embodiments, the picture can comprise one or more slices and one or more subpictures. In some embodiments, the video frame is in a bitstream. In some embodiments, the one or more slices are rectangular slices.

In step S26020, a variable indicating a number of slices in the picture minus a number of subpictures in the picture minus 1 is signaled in a picture parameter set of the picture. For example, the variable can be num_slices_in_pic_minus_subpic_num_minus1 shown in FIG. 21 or FIG. 22. In some embodiments, a minimum slice number can be equal to the number of subpictures plus 1. In some embodiments, as shown in FIG. 21 and FIG. 22, slice number minus subpicture number and then minus 1 (e.g., num_slices_in_pic_minus_subpic_num_minus1) can be signaled instead of slice number minus 1 (e.g., num_slices_in_pic_minus1) to reduce the signaled bit number. In some embodiments, the variable is a part of the PPS. In some embodiments, as shown in FIG. 22, the value of num_slices_in_pic_minus_subpic_num_minus1 plus subpicture number and plus 1 can specify the number of rectangular slices in each picture referring to the PPS. In some embodiments, similar to the semantics shown in FIG. 20, variable num_slices_in_pic_minus2 can replace variable num_slices_in_pic_minus_1.

In some embodiments, as shown in step S26020, a variable that indicates a number of slices in the picture can be determined according to the variable indicating the number of slices in the video frame minus a number of subpictures in the video frame minus 1. For example, as shown in FIG. 21 and FIG. 22, a flag or variable SliceNumInPic can be derived according to variable num_slices_in_pic_minus_subpic_num_minus1.

Figure 27:
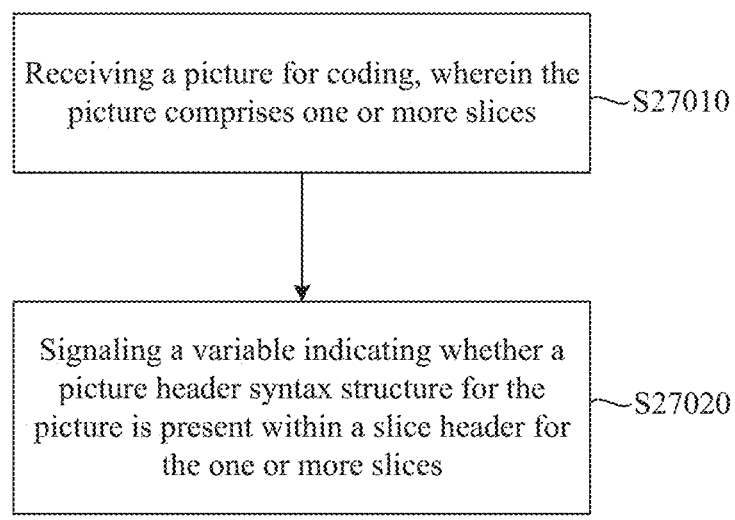
FIG. 27 shows a flowchart of an example video coding method with a variable indicating whether a picture header syntax structure is present within a slice header of a video frame, according to some embodiments of the present disclosure.

FIG. 27 shows a flowchart of an example video coding method with a variable indicating whether a picture header syntax structure is present within a slice header of a video frame, according to some embodiments of the present disclosure. In some embodiments, method 27000 shown in FIG. 27 can be performed by apparatus 400 shown in FIG. 4. In some embodiments, method 27000 shown in FIG. 27 can be executed according to the syntax shown in FIG. 23. In some embodiments, method 27000 shown in FIG. 27 can be performed according to the VVC standard.

In step S27010, a picture is received for coding. The picture comprises one or more slices. In some embodiments, the picture is in a bitstream. In some embodiments, the one or more slices are rectangular slices.

In step S27020, a variable indicating whether a picture header syntax structure for the picture is present within a slice header for the one or more slices is signaled. For example, the variable can be picture_header_in_slice_header_flag shown in FIG. 23. In some embodiments, as shown in FIG. 23, when the PH syntax structure is present in the slice header, the picture may have only one slice. Therefore, there is also no need to signal slice address. As a result, the signaling of slice address can be conditioned on variable picture_header_in_slice_header_flag. In some embodiments, the variable is a part of the PPS.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for video decoding, comprising:
receiving a wrap-around motion compensation flag;
determining whether a wrap-around motion compensation is enabled based on the wrap-around motion compensation flag;
in response to a determination that the wrap-around motion compensation is enabled, receiving data indicating a difference between a width of the picture and an offset used for determining a horizontal wrap-around position; and
performing a motion compensation according to the wrap-around motion compensation flag and the difference.

2. The method of clause 1, wherein the difference is in units of a size of a minimum luma coding block 3. The method of clause 2, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

4. The method of clause 1, wherein performing the motion compensation further comprises:
determining a wrap-around motion compensation offset according to the width of the picture and the difference; and
performing the motion compensation according to the wrap-around motion compensation offset.

5. The method of clause 4, wherein determining the wrap-around motion compensation offset according to the width of the picture and the difference further comprises:
dividing the width of the picture in units of luma samples by a size of a minimum luma coding block, to generate a first value; and determining the wrap-around motion compensation offset as being equal to the first value minus the difference.

6. The method of clause 1, wherein receiving the data indicating the difference further comprises:
receiving a wrap-around offset type flag;
determining whether the wrap-around offset type flag is equal to a first value or a second value;
in response to a determination that the wrap-around offset type flag is equal to the first value, receiving the data indicating the difference between the width of the picture and the offset used for computing a horizontal wrap-around position; and
in response to a determination that the wrap-around offset type flag is equal to the second value, receiving the data indicating the offset used for computing a horizontal wrap-around position.

7. The method of clause 6, wherein each of the first value and the second value is 0 or 1.

8. The method of clause 1, wherein the motion compensation is performed according to versatile video coding standard.

9. The method of clause 1, wherein the picture is a part of a 360-degree video sequence.

10. The method of clause 1, wherein the wrap-around motion compensation flag and the difference are signaled in a Picture Parameter Set (PPS).

11. A method for video decoding, comprising:
signaling a wrap-around motion compensation flag indicating whether a wrap-around motion compensation is enabled;
in response to the wrap-around motion compensation flag indicating the wrap-around motion compensation is enabled, signaling data indicating a difference between a width of the picture and an offset used for determining a horizontal wrap-around position; and
performing a motion compensation according to the wrap-around motion compensation flag and the difference.

12. The method of clause 11, wherein the difference is in units of a size of a minimum luma coding block 13. The method of clause 12, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

14. The method of clause 11, wherein performing the motion compensation further comprises:
determining a wrap-around motion compensation offset according to the width of the picture and the difference; and
performing the motion compensation according to the wrap-around motion compensation offset.

15. The method of clause 14, wherein determining the wrap-around motion compensation offset according to the width of the picture and the difference further comprises:
dividing the width of the picture in units of luma samples by a size of a minimum luma coding block, to generate a first value; and
determining the wrap-around motion compensation offset as being equal to the first value minus the difference.

16. The method of clause 11, wherein signaling the data indicating the difference further comprises:
signaling a wrap-around offset type flag, wherein a value of the wrap-around offset type flag can be a first value or a second value;
in response to the value of the wrap-around offset type flag is equal to the first value, signaling the data indicating the difference between the width of the picture and the offset used for computing a horizontal wrap-around position; and
in response to the value of the wrap-around offset type flag is equal to the second value, signaling the data indicating the offset used for computing a horizontal wrap-around position.

17. The method of clause 16, wherein each of the first value and the second value is 0 or 1.

18. The method of clause 11, wherein the motion compensation is performed according to versatile video coding standard.

19. The method of clause 11, wherein the picture is a part of a 360-degree video sequence.

20. The method of clause 11, wherein the wrap-around motion compensation flag and the difference are signaled in a Picture Parameter Set (PPS).

21. A method for video coding, comprising:
receiving a picture for coding, wherein the picture comprises one or more slices; and
signaling, in a picture parameter set of the picture, a variable indicating a number of slices in the video frame minus 2.

22. The method of clause 21, wherein the picture is in a bitstream.

23. The method of clause 21, wherein the picture is coded according to versatile video coding standard.

24. The method of clause 21, wherein the one or more slices are rectangular slices.

25. A method for video coding, comprising:
receiving a picture for coding, wherein the picture comprises one or more slices and one or more subpictures; and
signaling, in a picture parameter set of the picture, a variable indicating a number of slices in the picture minus a number of subpictures in the picture minus 1.

26. The method of clause 25, wherein the picture is in a bitstream.

27. The method of clause 25, further comprising:
determining a variable that indicates a number of slices in the picture according to the variable indicating the number of slices in the picture minus a number of subpictures in the picture minus 1.

28. The method of clause 25, wherein the picture is coded according to versatile video coding standard.

29. The method of clause 25, wherein the one or more slices are rectangular slices.

30. A method for video coding, comprising:

receiving a picture for coding, wherein the picture comprises one or more slices;

signaling a variable indicating whether a picture header syntax structure for the picture is present within a slice header for the one or more slices; and signaling a slice address according to the variable.

31. The method of clause 30, wherein the picture is in a bitstream.

32. The method of clause 30, wherein the picture is coded according to versatile video coding standard.

33. The method of clause 30, wherein the one or more slices are rectangular.

34. A system for performing video data processing, the system comprising:

a memory storing a set of instructions; and a processor configured to execute the set of instructions to cause the system to perform:

receiving a wrap-around motion compensation flag;

determining whether a wrap-around motion compensation is enabled based on the wrap-around motion compensation flag;

in response to a determination that the wrap-around motion compensation is enabled, receiving data indicating a difference between a width of the picture and an offset used for determining a horizontal wrap-around position; and performing a motion compensation according to the wrap-around motion compensation flag and the difference.

35. The system of clause 34, wherein the difference is in units of a size of a minimum luma coding block 36. The system of clause 35, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

37. The system of clause 34, wherein, in performing the motion compensation, the processor is configured to execute the set of instructions to cause the system to perform:

determining a wrap-around motion compensation offset according to the width of the picture and the difference; and performing the motion compensation according to the wrap-around motion compensation offset.

38. The system of clause 37, wherein, in determining the wrap-around motion compensation offset according to the width of the picture and the difference, the processor is configured to execute the set of instructions to cause the system to perform:

dividing the width of the picture in units of luma samples by a size of a minimum luma coding block, to generate a first value; and determining the wrap-around motion compensation offset as being equal to the first value minus the difference.

39. The system of clause 34, wherein, in receiving the data indicating the difference, the processor is configured to execute the set of instructions to cause the system to perform:

receiving a wrap-around offset type flag;

determining whether the wrap-around offset type flag is equal to a first value or a second value;

in response to a determination that the wrap-around offset type flag is equal to the first value, receiving the data indicating the difference between the width of the picture and the offset used for computing a horizontal wrap-around position; and in response to a determination that the wrap-around offset type flag is equal to the second value, receiving the data indicating the offset used for computing a horizontal wrap-around position.

40. The system of clause 39, wherein each of the first value and the second value is 0 or 1.

41. The system of clause 34, wherein the motion compensation is performed according to versatile video coding standard.

42. The system of clause 34, wherein the picture is a part of a 360-degree video sequence.

43. The system of clause 34, wherein the wrap-around motion compensation flag and the difference are signaled in a Picture Parameter Set (PPS).

44. A system for performing video data processing, the system comprising:

a memory storing a set of instructions; and a processor configured to execute the set of instructions to cause the system to perform:

signaling a wrap-around motion compensation flag indicating whether a wrap-around motion compensation is enabled;

in response to the wrap-around motion compensation flag indicating the wrap-around motion compensation is enabled, signaling data indicating a difference between a width of the picture and an offset used for determining a horizontal wrap-around position; and performing a motion compensation according to the wrap-around motion compensation flag and the difference.

45. The system of clause 44, wherein the difference is in units of a size of a minimum luma coding block 46. The system of clause 45, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

47. The system of clause 44, wherein, in performing the motion compensation, the processor is configured to execute the set of instructions to cause the system to perform:

determining a wrap-around motion compensation offset according to the width of the picture and the difference; and performing the motion compensation according to the wrap-around motion compensation offset.

48. The system of clause 47, wherein, in determining the wrap-around motion compensation offset according to the width of the picture and the difference, the processor is configured to execute the set of instructions to cause the system to perform:

dividing the width of the picture in units of luma samples by a size of a minimum luma coding block, to generate a first value; and determining the wrap-around motion compensation offset as being equal to the first value minus the difference.

49. The system of clause 44, wherein, in receiving the data indicating the difference, the processor is configured to execute the set of instructions to cause the system to perform:

signaling a wrap-around offset type flag, wherein a value of the wrap-around offset type flag can be a first value or a second value;

in response to the value of the wrap-around offset type flag is equal to the first value, signaling the data indicating the difference between the width of the picture and the offset used for computing a horizontal wrap-around position; and in response to the value of the wrap-around offset type flag is equal to the second value, signaling the data indicating the offset used for computing a horizontal wrap-around position.

50. The system of clause 49, wherein each of the first value and the second value is 0 or 1.

51. The system of clause 44, wherein the motion compensation is performed according to versatile video coding standard.

52. The system of clause 44, wherein the picture is a part of a 360-degree video sequence.

53. The system of clause 44, wherein the wrap-around motion compensation flag and the difference are signaled in a Picture Parameter Set (PPS).

54. A system for performing video coding, the system comprising:
a memory storing a set of instructions; and
a processor configured to execute the set of instructions to cause the system to perform:
receiving a picture for coding, wherein the picture comprises one or more slices; and
signaling, in a picture parameter set of the picture, a variable indicating a number of slices in the video frame minus 2.

55. The system of clause 54, wherein the picture is in a bitstream.

56. The system of clause 54, wherein the picture is coded according to versatile video coding standard.

57. The system of clause 54, wherein the one or more slices are rectangular slices.

58. A system for performing video coding, the system comprising:
a memory storing a set of instructions; and
a processor configured to execute the set of instructions to cause the system to perform:
receiving a picture for coding, wherein the picture comprises one or more slices and one or more subpictures; and
signaling, in a picture parameter set of the picture, a variable indicating a number of slices in the picture minus a number of subpictures in the picture minus 1.

59. The system of clause 58, wherein the picture is in a bitstream.

60. The system of clause 58, wherein the processor is configured to execute the set of instructions to cause the system to perform:
determining a variable that indicates a number of slices in the picture according to the variable indicating the number of slices in the picture minus a number of subpictures in the picture minus 1.

61. The system of clause 58, wherein the picture is coded according to versatile video coding standard.

62. The system of clause 58, wherein the one or more slices are rectangular slices.

63. A system for performing video coding, the system comprising:
a memory storing a set of instructions; and
a processor configured to execute the set of instructions to cause the system to perform:
receiving a picture for coding, wherein the picture comprises one or more slices;
signaling a variable indicating whether a picture header syntax structure for the picture is present within a slice header for the one or more slices; and
signaling a slice address according to the variable.

64. The system of clause 63, wherein the picture is in a bitstream.

65. The system of clause 63, wherein the picture is coded according to versatile video coding standard.

66. The system of clause 63, wherein the one or more slices are rectangular.

67. A non-transitory computer readable medium that stores a set of instructions that is executable by one or more processors of an apparatus to cause the apparatus to initiate a method for performing video data processing, the method comprising:
receiving a wrap-around motion compensation flag;
determining whether a wrap-around motion compensation is enabled based on the wrap-around motion compensation flag;
in response to a determination that the wrap-around motion compensation is enabled, receiving data indicating a difference between a width of the picture and an offset used for determining a horizontal wrap-around position; and
performing a motion compensation according to the wrap-around motion compensation flag and the difference.

68. The non-transitory computer readable medium of clause 67, wherein the difference is in units of a size of a minimum luma coding block 69. The non-transitory computer readable medium of clause 68, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

70. The non-transitory computer readable medium of clause 67, wherein performing the motion compensation further comprises:
determining a wrap-around motion compensation offset according to the width of the picture and the difference; and
performing the motion compensation according to the wrap-around motion compensation offset.

71. The non-transitory computer readable medium of clause 70, wherein determining the wrap-around motion compensation offset according to the width of the picture and the difference further comprises:
dividing the width of the picture in units of luma samples by a size of a minimum luma coding block, to generate a first value; and
determining the wrap-around motion compensation offset as being equal to the first value minus the difference.

72. The non-transitory computer readable medium of clause 67, wherein receiving the data indicating difference further comprises:
receiving a wrap-around offset type flag;
determining whether the wrap-around offset type flag is equal to a first value or a second value;
in response to a determination that the wrap-around offset type flag is equal to the first value, receiving the data indicating the difference between the width of the picture and the offset used for computing a horizontal wrap-around position; and
in response to a determination that the wrap-around offset type flag is equal to the second value, receiving the data indicating the offset used for computing a horizontal wrap-around position.

73. The non-transitory computer readable medium of clause 72, wherein each of the first value and the second value is 0 or 1.

74. The non-transitory computer readable medium of clause 67, wherein the motion compensation is performed according to versatile video coding standard.

75. The non-transitory computer readable medium of clause 67, wherein the picture is a part of a 360-degree video sequence.

76. The non-transitory computer readable medium of clause 67, wherein the wrap-around motion compensation flag and the difference are signaled in a Picture Parameter Set (PPS).

77. A non-transitory computer readable medium that stores a set of instructions that is executable by one or more processors of an apparatus to cause the apparatus to initiate a method for performing video data processing, the method comprising:

signaling a wrap-around motion compensation flag indicating whether a wrap-around motion compensation is enabled;

in response to the wrap-around motion compensation flag indicating the wrap-around motion compensation is enabled, signaling data indicating a difference between a width of the picture and an offset used for determining a horizontal wrap-around position; and performing a motion compensation according to the wrap-around motion compensation flag and the difference.

78. The non-transitory computer readable medium of clause 77, wherein the difference is in units of a size of a minimum luma coding block.

79. The non-transitory computer readable medium of clause 78, wherein the difference is less than or equal to (pps_pic_width_in_luma_samples/MinCbSizeY)−(CtbSizeY/MinCbSizeY)−2, wherein pps_pic_width_in_luma_samples is the width of the picture in units of luma samples, MinCbSizeY is the size of the minimum luma coding block, and CtbSizeY is a size of a luma coding tree block.

80. The non-transitory computer readable medium of clause 77, wherein performing the motion compensation further comprises:

determining a wrap-around motion compensation offset according to the width of the picture and the difference; and performing the motion compensation according to the wrap-around motion compensation offset.

81. The non-transitory computer readable medium of clause 80, wherein determining the wrap-around motion compensation offset according to the width of the picture and the difference further comprises:

dividing the width of the picture in units of luma samples by a size of a minimum luma coding block, to generate a first value; and determining the wrap-around motion compensation offset as being equal to the first value minus the difference.

82. The non-transitory computer readable medium of clause 77, wherein receiving the data indicating difference further comprises:

signaling a wrap-around offset type flag, wherein a value of the wrap-around offset type flag can be a first value or a second value;

in response to the value of the wrap-around offset type flag is equal to the first value, signaling the data indicating the difference between the width of the picture and the offset used for computing a horizontal wrap-around position; and in response to the value of the wrap-around offset type flag is equal to the second value, signaling the data indicating the offset used for computing a horizontal wrap-around position.

83. The non-transitory computer readable medium of clause 82, wherein each of the first value and the second value is 0 or 1.

84. The non-transitory computer readable medium of clause 77, wherein the motion compensation is performed according to versatile video coding standard.

85. The non-transitory computer readable medium of clause 77, wherein the picture is a part of a 360-degree video sequence.

86. The non-transitory computer readable medium of clause 77, wherein the wrap-around motion compensation flag and the difference are signaled in a Picture Parameter Set (PPS).

87. A non-transitory computer readable medium that stores a set of instructions that is executable by one or more processors of an apparatus to cause the apparatus to initiate a method for performing video coding, the method comprising:

receiving a picture for coding, wherein the picture comprises one or more slices; and signaling, in a picture parameter set of the picture, a variable indicating a number of slices in the video frame minus 2.

88. The non-transitory computer readable medium of clause 87, wherein the picture is in a bitstream.

89. The non-transitory computer readable medium of clause 87, wherein the picture is coded according to versatile video coding standard.

90. The non-transitory computer readable medium of clause 87, wherein the one or more slices are rectangular slices.

91. A non-transitory computer readable medium that stores a set of instructions that is executable by one or more processors of an apparatus to cause the apparatus to initiate a method for performing video coding, the method comprising:

receiving a picture for coding, wherein the picture comprises one or more slices and one or more subpictures; and signaling, in a picture parameter set of the picture, a variable indicating a number of slices in the picture minus a number of subpictures in the picture minus 1.

92. The non-transitory computer readable medium of clause 91, wherein the picture is in a bitstream.

93. The non-transitory computer readable medium of clause 91, further comprising:

determining a variable that indicates a number of slices in the picture according to the variable indicating the number of slices in the picture minus a number of subpictures in the picture minus 1.

94. The non-transitory computer readable medium of clause 91, wherein the picture is coded according to versatile video coding standard.

95. The non-transitory computer readable medium of clause 91, wherein the one or more slices are rectangular slices.

96. A non-transitory computer readable medium that stores a set of instructions that is executable by one or more processors of an apparatus to cause the apparatus to initiate a method for performing video coding, the method comprising:

receiving a picture for coding, wherein the picture comprises one or more slices;

signaling a variable indicating whether a picture header syntax structure for the picture is present within a slice header for the one or more slices; and signaling a slice address according to the variable.

97. The non-transitory computer readable medium of clause 96, wherein the picture is in a bitstream.

98. The non-transitory computer readable medium of clause 96, wherein the picture is coded according to versatile video coding standard.

99. The non-transitory computer readable medium of clause 96, wherein the one or more slices are rectangular.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for video decoding, comprising:
   receiving a wrap-around motion compensation flag;
   determining whether a wrap-around motion compensation is enabled based on the wrap-around motion compensation flag;
   in response to a determination that the wrap-around motion compensation is enabled, receiving data indicating a difference between a width of the picture and an offset used for determining a horizontal wrap-around position, wherein the difference is in units of a size of a minimum luma coding block; and
   performing a motion compensation according to the wrap-around motion compensation flag and the difference.

2. The method of claim 1, wherein the difference is less than or equal to (ppspic_width_in_luma_samples/MinCbSizeY)−(CtbSizeY/MinCbSizeY)−2, wherein ppspic_width_in_luma_samples is the width of the picture in units of luma samples, MinCbSizeY is the size of the minimum luma coding block, and CtbSizeY is a size of a luma coding tree block.

3. The method of claim 1, wherein performing the motion compensation further comprises:
   determining a wrap-around motion compensation offset according to the width of the picture and the difference; and
   performing the motion compensation according to the wrap-around motion compensation offset.

4. The method of claim 3, wherein determining the wrap-around motion compensation offset according to the width of the picture and the difference further comprises:
   dividing the width of the picture in units of luma samples by a size of a minimum luma coding block, to generate a first value; and
   determining the wrap-around motion compensation offset as being equal to the first value minus the difference.

5. The method of claim 1, wherein receiving the data indicating the difference further comprises:
   receiving a wrap-around offset type flag;
   determining whether the wrap-around offset type flag is equal to a first value or a second value;
   in response to a determination that the wrap-around offset type flag is equal to the first value, receiving the data indicating the difference between the width of the picture and the offset used for computing a horizontal wrap-around position; and
   in response to a determination that the wrap-around offset type flag is equal to the second value, receiving the data indicating the offset used for computing a horizontal wrap-around position.

6. The method of claim 5, wherein each of the first value and the second value is 0 or 1.

7. The method of claim 1, wherein the motion compensation is performed according to versatile video coding standard.

8. The method of claim 1, wherein the picture is a part of a 360-degree video sequence.

9. The method of claim 1, wherein the wrap-around motion compensation flag and the difference are signaled in a Picture Parameter Set (PPS).

10. A system for performing video data processing, the system comprising:
    a memory storing a set of instructions; and
    one or more processors configured to execute the set of instructions to cause the system to perform:
    signaling a wrap-around motion compensation flag;
    determining whether a wrap-around motion compensation is enabled based on the wrap-around motion compensation flag;
    in response to a determination that the wrap-around motion compensation is enabled, signaling data indicating a difference between a width of the picture and an offset used for determining a horizontal wrap-around position, wherein the difference is in units of a size of a minimum luma coding block; and
    wherein the wrap-around motion compensation flag and the difference are used to perform a motion compensation.

11. The system of claim 10, wherein the difference is less than or equal to (ppspic_width_in_luma_samples/MinCbSizeY)−(CtbSizeY/MinCbSizeY)−2, wherein ppspic_width_in_luma_samples is the width of the picture in units of luma samples, MinCbSizeY is the size of the minimum luma coding block, and CtbSizeY is a size of a luma coding tree block.

12. The system of claim 10, wherein, in performing the motion compensation:
    a wrap-around motion compensation offset according to the width of the picture and the difference is determined; and
    the wrap-around motion compensation offset is used to perform the motion compensation.

13. The system of claim 12, wherein, in determining the wrap-around motion compensation offset according to the width of the picture and the difference,
    the width of the picture in units of luma samples is divided by a size of a minimum luma coding block, to generate a first value; and
    the wrap-around motion compensation offset is determined as being equal to the first value minus the difference.

14. The system of claim 10, wherein, in signaling the data indicating the difference, the one or more processors are configured to execute the set of instructions to cause the system to perform:
    signaling a wrap-around offset type flag;
    determining whether the wrap-around offset type flag is equal to a first value or a second value;
    in response to a determination that the wrap-around offset type flag is equal to the first value, signaling the data indicating the difference between the width of the picture and the offset used for computing a horizontal wrap-around position; and
    in response to a determination that the wrap-around offset type flag is equal to the second value, signaling the data indicating the offset used for computing a horizontal wrap-around position.

15. The system of claim 14, wherein each of the first value and the second value is 0 or 1.

16. The system of claim 10, wherein the motion compensation is performed according to versatile video coding standard.

17. The system of claim 10, wherein the wrap-around motion compensation flag and the difference are signaled in a Picture Parameter Set (PPS).

18. A non-transitory computer readable medium that stores a bitstream of a video for processing according to a method comprising:
- receiving a wrap-around motion compensation flag;
- determining whether a wrap-around motion compensation is enabled based on the wrap-around motion compensation flag;
- in response to a determination that the wrap-around motion compensation is enabled, receiving data indicating a difference between a width of the picture and an offset used for determining a horizontal wrap-around position, wherein the difference is in units of a size of a minimum luma coding block; and
- performing a motion compensation according to the wrap-around motion compensation flag and the difference.

* * * * *